(12) United States Patent
Carlson et al.

(10) Patent No.: US 11,154,175 B2
(45) Date of Patent: Oct. 26, 2021

(54) SURFACE MAINTENANCE MACHINE WITH REMOVABLE STORAGE

(71) Applicant: Tennant Company, Minneapolis, MN (US)

(72) Inventors: Brett Jason Carlson, Rogers, MN (US); Matthew Ryan Baldwin, St. Louis Park, MN (US); Laurence A. Jensen, Oakdale, MN (US); John C. Ickes, Rockford, MN (US); Martin L. Dickrell, Golden Valley, MN (US); Michael M. Dimovski, Elk River, MN (US); Stefan Sehmke, Brecht (BE); Jacob L. Stock, Plymouth, MN (US)

(73) Assignee: Tennant Company, Eden Prairie, MN (US)

( * ) Notice: Subject to any disclaimer, the term of this patent is extended or adjusted under 35 U.S.C. 154(b) by 468 days.

(21) Appl. No.: 16/164,487

(22) Filed: Oct. 18, 2018

(65) Prior Publication Data

US 2019/0110657 A1   Apr. 18, 2019

Related U.S. Application Data

(60) Provisional application No. 62/573,888, filed on Oct. 18, 2017.

(51) Int. Cl.
*B60D 1/02* (2006.01)
*B60D 1/36* (2006.01)
(Continued)

(52) U.S. Cl.
CPC .......... *A47L 11/4091* (2013.01); *A47L 11/40* (2013.01); *A47L 11/4066* (2013.01); *A47L 13/51* (2013.01);
(Continued)

(58) Field of Classification Search
CPC ....... B60D 1/48; B60D 1/02; B60D 2001/005
(Continued)

(56) References Cited

U.S. PATENT DOCUMENTS 5,483,718 A * 1/1996 Blehert ................. A47L 11/302
    15/325
5,727,642 A * 3/1998 Abbott ............... A63B 71/0009
    180/6.5

(Continued)

FOREIGN PATENT DOCUMENTS

GB       2497132 A      6/2013
WO    2011057100 A1     5/2011

OTHER PUBLICATIONS

International Patent Application No. PCT/US2018/056576, International Search Report and Written Opinion dated Jan. 23, 2019, 14 pages.

*Primary Examiner* — Tony H Winner
(74) *Attorney, Agent, or Firm* — Fredrikson & Byron, P.A.

(57) ABSTRACT

A coupling mechanism for removably coupling a storage cart to a surface maintenance machine includes a cart-side connector connectable to the storage cart and a machine-side connector connectable to the surface maintenance machine. The coupling mechanism includes a connecting rod engageable with the machine-side connector. The coupling mechanism includes a bracket assembly positioned between the cart-side connector and the machine-side connector. The bracket assembly can receive the connecting rod to engage therewith to facilitate a first relative movement between the connecting rod and a portion of the bracket assembly in a direction perpendicular to a floor surface on which the surface maintenance machine is traveling, and a pivoting of the bracket assembly about a pivot axis passing through the connecting rod.

26 Claims, 26 Drawing Sheets

(51) Int. Cl.
*B60D 1/48* (2006.01)
*A47L 13/51* (2006.01)
*B60D 1/00* (2006.01)
*A47L 11/40* (2006.01)
*E01H 1/02* (2006.01)

(52) U.S. Cl.
CPC ............... *B60D 1/02* (2013.01); *B60D 1/36* (2013.01); *B60D 1/48* (2013.01); *B60D 2001/005* (2013.01); *E01H 1/02* (2013.01)

(58) Field of Classification Search
USPC .................................... 224/401, 411, 488
See application file for complete search history.

(56) References Cited

U.S. PATENT DOCUMENTS

| | | | |
|---|---|---|---|
| 5,765,868 A * | 6/1998 | Ventrone | B62B 3/02 220/482 |
| 5,848,797 A * | 12/1998 | Paez | B62B 3/144 280/33.993 |
| 5,913,528 A * | 6/1999 | Kresse | B62B 3/02 280/47.35 |
| 6,530,102 B1 | 3/2003 | Pierce et al. | |
| 6,698,770 B2 * | 3/2004 | Eriksson | A61G 12/001 280/33.991 |
| 7,648,147 B2 * | 1/2010 | Lauer | B62B 3/104 280/47.35 |
| 8,419,024 B1 * | 4/2013 | Arroyo-Ferrer | B62B 3/02 280/47.35 |
| 8,584,294 B2 | 11/2013 | Loring | |
| 9,545,183 B2 * | 1/2017 | Maurer | A47L 11/4091 |
| 9,643,669 B1 * | 5/2017 | Clark | B60D 1/07 |
| 2002/0179116 A1 * | 12/2002 | Shinler | A47L 11/24 134/6 |
| 2004/0226578 A1 | 11/2004 | Guest et al. | |
| 2012/0325876 A1 * | 12/2012 | Hill | B65F 1/1452 224/401 |
| 2017/0164804 A1 | 6/2017 | Dickrell et al. | |
| 2017/0164805 A1 | 6/2017 | Ickes et al. | |
| 2019/0202249 A1 * | 7/2019 | Adachi | B60D 1/36 |

* cited by examiner

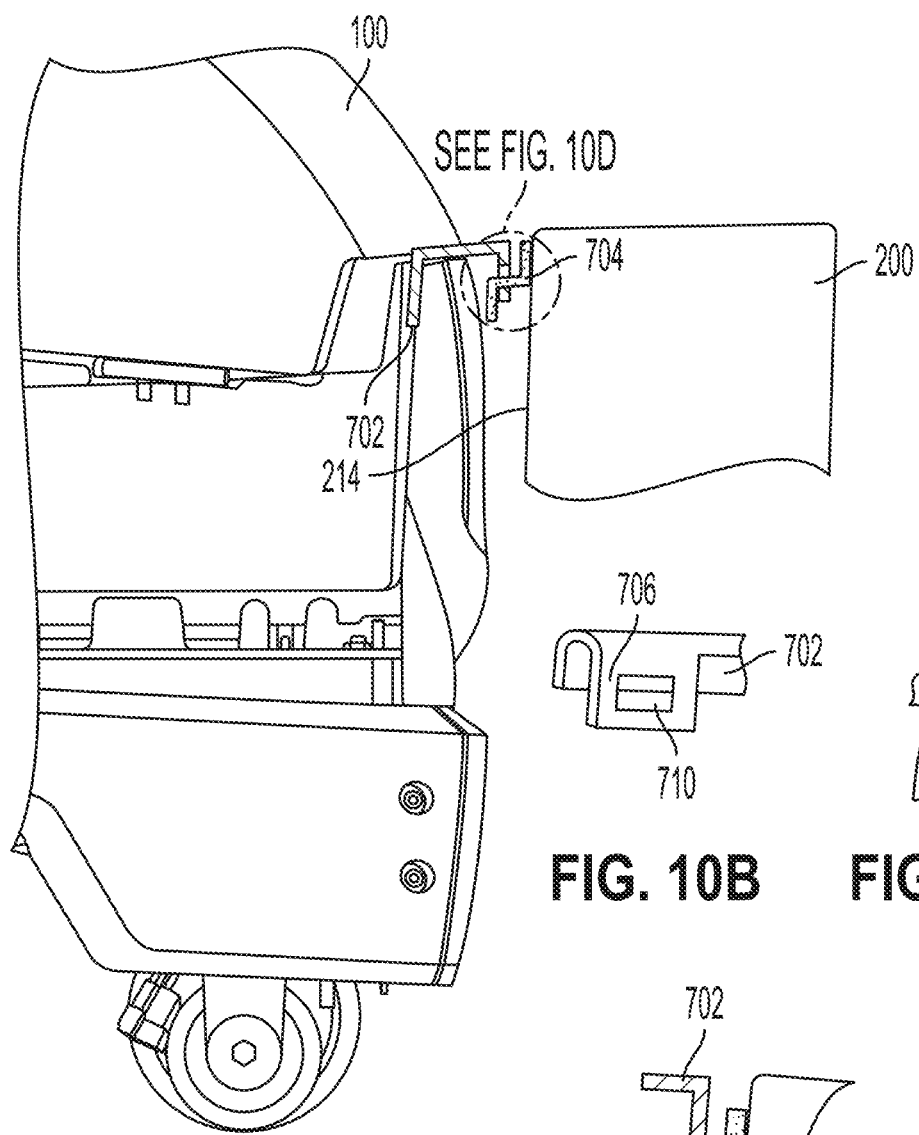

FIG. 11B  FIG. 11C

SURFACE MAINTENANCE MACHINE WITH REMOVABLE STORAGE

CROSS REFERENCE TO RELATED APPLICATION

This application claims the benefit of U.S. Provisional Patent Application No. 62/573,888, filed Oct. 18, 2017 and titled "SURFACE MAINTENANCE MACHINE WITH REMOVABLE STORAGE." The entire content of this application is incorporated herein by reference.

BACKGROUND

Surface maintenance machines for relatively large floor areas such as commercial, industrial, public or institutional spaces are typically integrated with an operator-driven vehicle. These machines can be a floor scrubbing machine or a floor sweeping machine. Other machines, such as polishing, burnishing or outdoor litter collecting machines can also perform surface maintenance operations such as cleaning (e.g., sweeping, scrubbing, etc.) polishing, burnishing, buffing, stripping and the like on surfaces such as floors, hallways, etc. of buildings, roads, pavements, sidewalks and the like.

Such walk-behind or ride-on surface maintenance machines may not be able to enter certain spaces, such as narrow aisles or doorways. In such areas, the operator may have to perform a manual surface maintenance operation (e.g., cleaning). Conventional surface maintenance machines may also lack storage areas for an operator to carry tools and supplies for performing one or more manual surface maintenance operations.

SUMMARY

In an aspect, the disclosure is directed to a coupling mechanism for removably coupling a storage cart to a surface maintenance machine. The coupling mechanism includes a cart-side connector connectable to the storage cart and a machine-side connector connectable to the surface maintenance machine. The coupling mechanism includes a connecting rod engageable with the machine-side connector. The coupling mechanism further includes a bracket assembly positioned between the cart-side connector and the machine-side connector. The bracket assembly can be connectable with the cart-side connector. The bracket assembly can be configured to receive the connecting rod to engage therewith. The engagement between the connecting rod and the bracket assembly can facilitate a first relative movement between the connecting rod and a portion of the bracket assembly in a direction perpendicular to a floor surface on which the surface maintenance machine is traveling, and a pivoting of the bracket assembly about a pivot axis passing through the connecting rod. The first relative movement and the pivoting can maintain one or more wheels of a plurality of wheels of the storage cart on an operating surface during travel of the surface maintenance machine thereon.

In some embodiments, the bracket assembly comprises a first bracket and a second bracket, the first bracket and the second bracket each having an elongate slot, the elongate slot being configured to receive the connecting rod thereby engaging the cart-side connector with the machine-side connector to engage the storage cart to the surface maintenance machine. In certain advantageous embodiments, the elongate slot is oriented so as to be elongate along the direction perpendicular to the operating surface.

In one or more aspects of the coupling mechanism disclosed herein, the first bracket is connectable to the cart-side connector. In some aspects, the coupling mechanism includes a handle attachable to portions of the bracket assembly (e.g., the second bracket). In some such embodiments, the handle can be raised or lowered to engage or disengage the connecting rod from the elongate slot, to connect or disconnect, respectively, the storage cart from the surface maintenance machine. In optional embodiments, the handle can be raised or lowered in the direction perpendicular to the operating surface, wherein, raising or lowering the handle permits a second relative movement between the first bracket and the second bracket in the direction perpendicular to the operating surface.

In optional embodiments, the first bracket and the second bracket are connected to each other by one or more spring-loaded pins. Each spring-loaded pin can be movable to an extended position when the handle is raised. In further optional embodiments, each spring-loaded pin can be movable to a retracted position when the handle is lowered. In such cases, each spring-loaded pin can be spring-biased to return to the retracted position from the extended position. Movement of each spring-loaded pin from the extended position to the retracted position can be, in certain instances, associated with movement of the second bracket toward the first bracket.

In further optional embodiments, the second bracket comprises a first edge and a second edge opposite to the first edge. The first edge can be more proximal to the cart-side connector than the second edge. The second edge can be more proximal to the machine-side connector than the first edge. Further, optionally, the second edge can be more proximal to the operating surface than the first edge.

In further optional embodiments, an aligning bracket can be connectable to the machine-side connector, the aligning bracket being configured to align with the bracket assembly so as to permit engagement of the connecting rod with the bracket assembly. The aligning bracket can include lateral flanges with openings for receiving the connecting rod.

In yet further optional embodiments, the coupling mechanism can include a mount and a receiver. The mount can include lateral mount flanges with circular apertures extending through the lateral mount flanges. The receiver can include lateral receiver flanges with elongate apertures extending through the lateral receiver flanges. The receiver can be configured to receive the mount to allow a connecting rod to be received through the circular apertures and the elongate apertures once aligned. The connecting rod can move within the elongate slot along a direction perpendicular to the operating surface.

Certain aspects also include a surface maintenance machine. The machine can have a mobile body supported by a plurality of wheels, one or more surface maintenance tools to perform one or more surface maintenance operations on an operating surface, and a coupling mechanism according to any of the disclosed embodiments.

In certain optional embodiments, the mobile body can include a front surface, a rear surface opposite to the front surface and lateral surfaces positioned laterally to the front surface and/or rear surface. In some such embodiments, the coupling mechanism can be coupled to at least one of the front surface, rear surface or lateral surface. In certain advantageous embodiments, the coupling mechanism can be coupled to the front surface of the surface maintenance machine such that an uppermost surface of the storage cart is more proximal to the operating surface than an uppermost surface of the surface maintenance machine.

BRIEF DESCRIPTION OF DRAWINGS

FIG. 10A is a view of a portion of the surface maintenance machine of FIG. 1A or FIG. 1B, connected to the removable cart of FIGS. 2-4 according to another embodiment;

FIG. 10B is a perspective view of a connector shown in FIG. 10A;

FIGS. 10C and 10D are side views of connectors shown in FIG. 10A;

FIGS. 11B and 11C are front perspective views of various connectors shown in FIG. 11A;

DETAILED DESCRIPTION

Figure 1A:
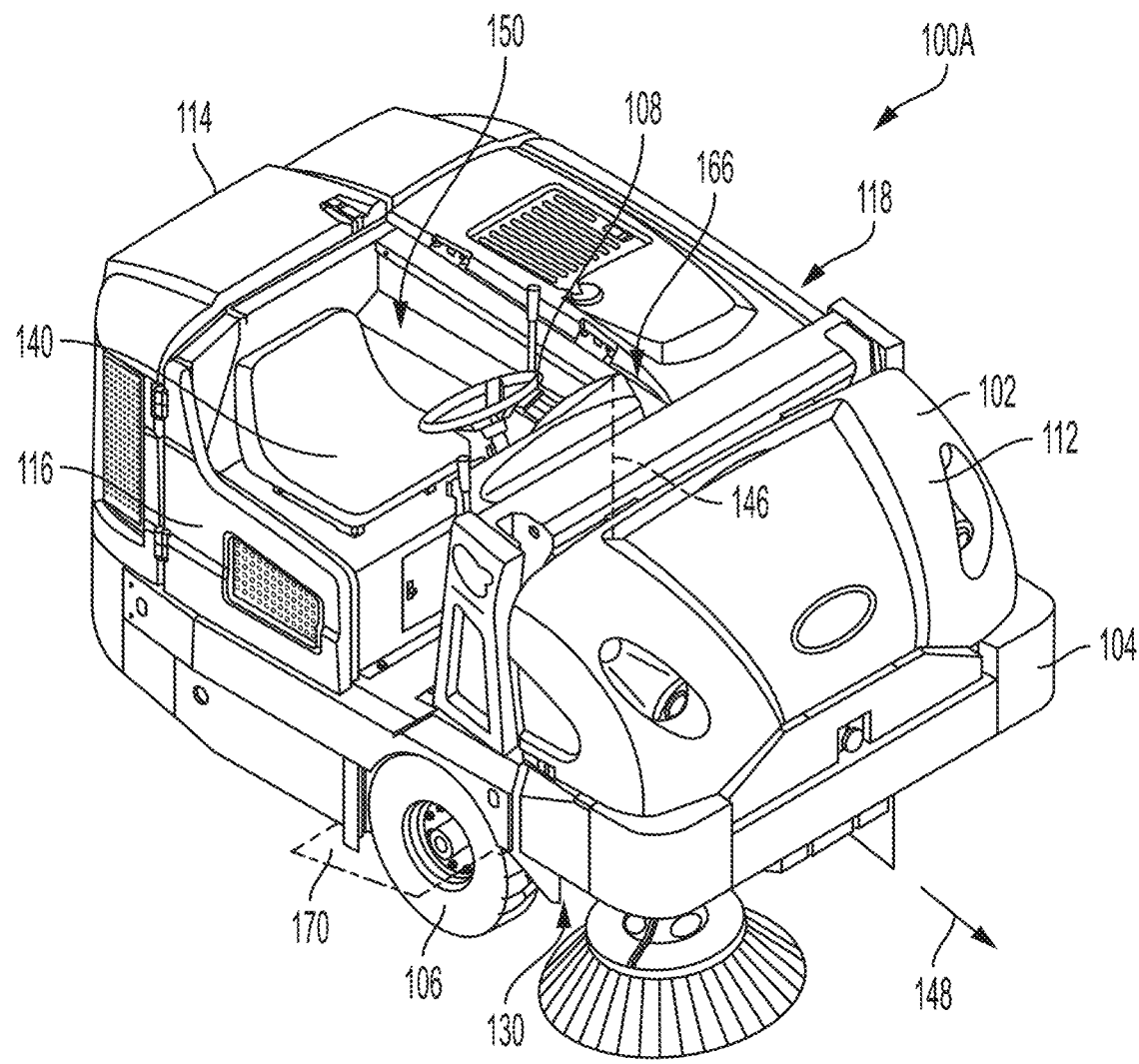
FIG. 1A is a perspective view of a surface maintenance machine according to an embodiment.
Figure 1B:
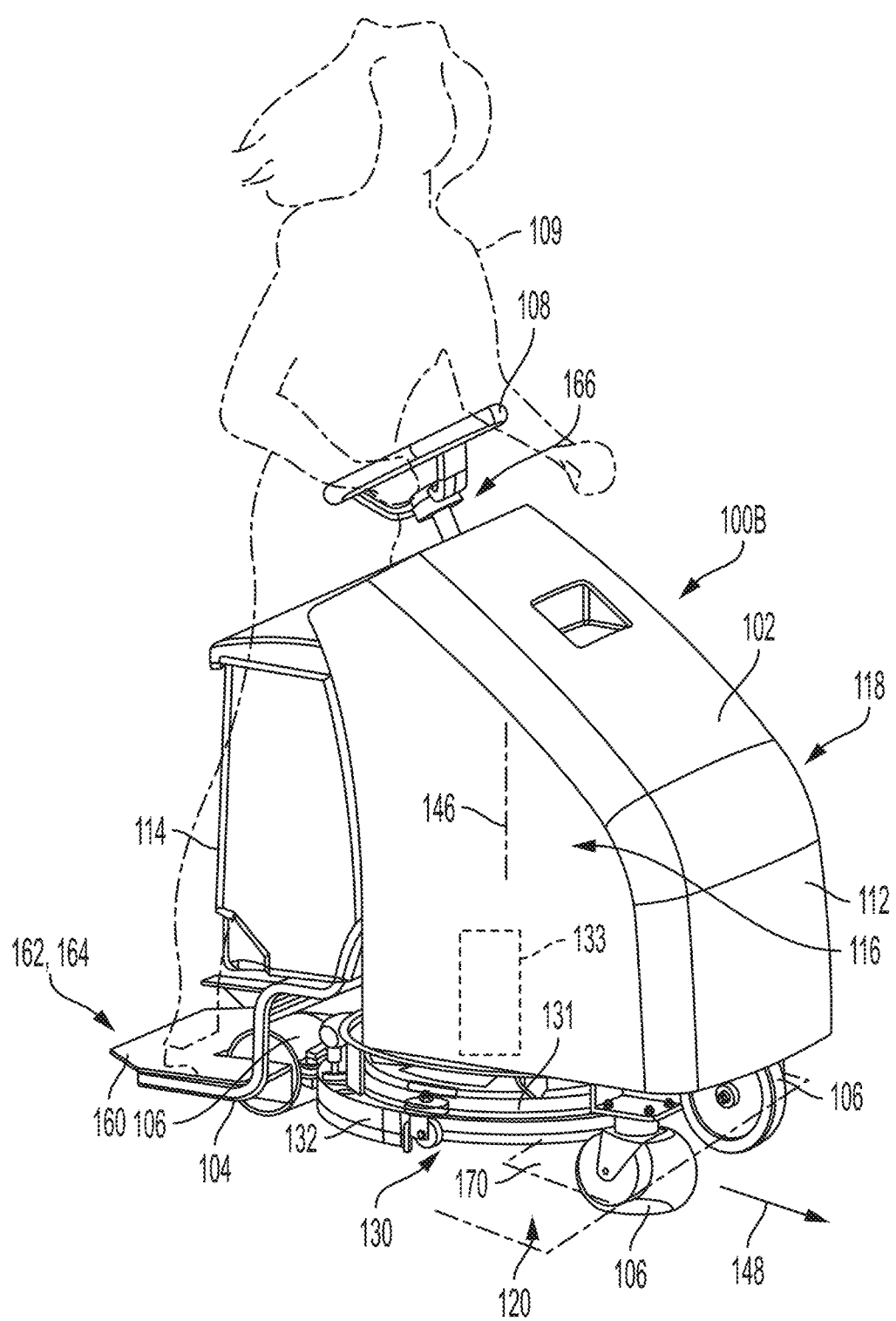
FIG. 1B is a perspective view of a surface maintenance machine according to another embodiment.

FIG. 1A is a perspective view of an exemplary surface maintenance machine 100A. FIG. 1B is a perspective view of another surface maintenance machine 100B. In the illustrated embodiment shown in FIGS. 1A and 1B, the surface maintenance machines 100A and 100B are each ride-on machines 100A. Alternatively, the disclosed embodiments can be used with surface maintenance machines that are walk-behind or tow-behind machines 100A. While an operator is illustrated in FIG. 1B, it should be understood that the machine 100 can be operated either by an operator 109, or can be programmed to operate as an autonomous guided vehicle.

The surface maintenance machines 100A, 100B can perform maintenance tasks such as sweeping, scrubbing, polishing (burnishing) a surface. The surface can be a floor surface, pavement, road surface and the like. Embodiments of the surface maintenance machines 100A, 100B include components that are supported on a mobile body 102. As best seen in FIGS. 1A and 1B, the mobile body 102 comprises a frame 104 supported on wheels 106 for travel over a surface, on which a surface maintenance operation is to be performed. The mobile body 102 may include operator controls (not shown) and a steering control such as a steering wheel 108 such to steer at least one wheel 106. In addition, speed controls such as a throttle to control the speed of the machine 100. The machine 100 can perform maintenance on a maintenance path which can have an area corresponding to an envelope defined by the front surface 112, rear surface 114 and two lateral surfaces 116 and 118 of the machine 100A, 100B as the machine 100 travels on an operating surface 120.

Figure 5:
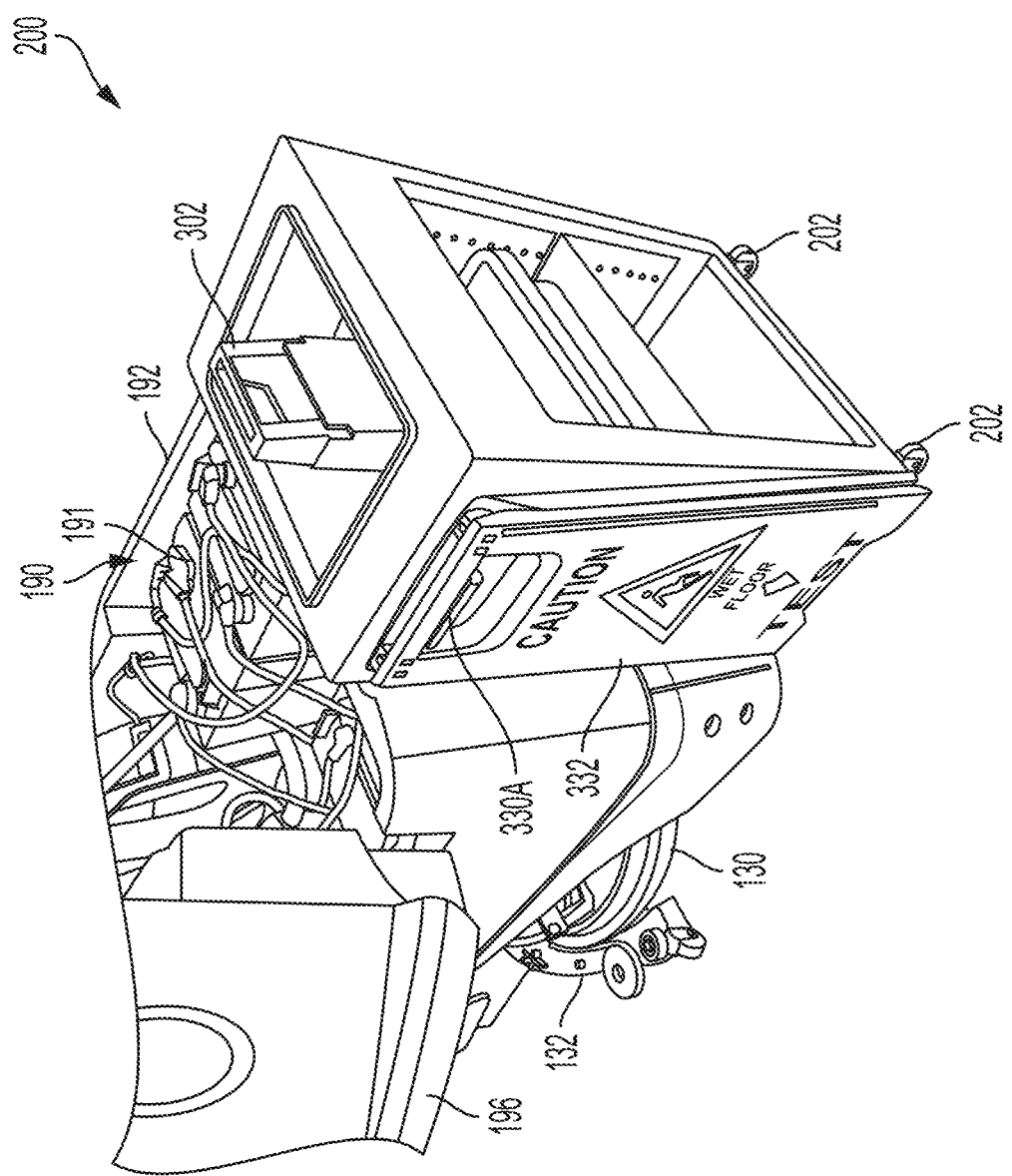
FIG. 5 is an enlarged perspective view of the removable cart of FIGS. 2-4.

The surface maintenance machine 100 can be self-propelling. For instance, the machine 100 can be powered by an on-board power source such as one or more batteries (e.g., as best seen in FIG. 5) or an internal combustion engine (not shown). The power source can be proximate the front of the surface maintenance machine 100, or it may instead be located elsewhere, such as within the interior of the surface maintenance machine 100, supported within the frame 104, and/or proximate the rear of the surface maintenance machine 100. The power provided by the on-board power source can be used to impart a rotational motion to at least one wheel 106. For instance, a motive source, such as a wheel motor can be coupled to at least one wheel 106, which can receive power from the on-board power source and provide torque, which can be transmitted to the wheel 106. Alternatively, the surface maintenance machine 100 can be powered by an external electrical source (e.g., a power generator) via an electrical outlet or a fuel cell. The interior of the surface maintenance machine 100 can include electrical connections (not shown) for transmission and control of various components.

The surface maintenance machine 100A, 100B can be powered by an on-board power source such as one or more batteries or an internal combustion engine (not shown). The power source can be proximate the front of the surface maintenance machine 100A, 100B or it may instead be located elsewhere, such as within the interior of the surface maintenance machine 100A, 100B, supported within the frame 104, and/or proximate the rear of the surface maintenance machine 100A, 100B. Alternatively, the surface maintenance machine 100A, 100B can be powered by an external electrical source (e.g., a power generator) via an electrical outlet or a fuel cell. The interior of the surface maintenance machine 100A, 100B can include electrical connections (not shown) for transmission and control of various components.

As perhaps best illustrated in FIG. 1B, the surface maintenance machine 100A, 100B includes a maintenance head assembly 130. The maintenance head assembly 130 houses one or more surface maintenance tools 131 such as scrub brushes, sweeping brushes, and polishing, stripping or burnishing pads, and tools for extracting (e.g., dry or wet vacuum tools). For example, the maintenance head is a cleaning head comprising one or more cleaning tools (e.g., sweeping or scrubbing brushes). Alternatively, the maintenance head is a treatment head comprising one or more treatment tools (e.g., polishing, stripping or buffing pads). Many different types of surface maintenance tools 131 are used to perform one or more maintenance operations on the operating surface 120. The maintenance operation can be a dry operation or a wet operation. Such maintenance tools 131 include sweeping, scrubbing brushes, wet scrubbing pads, polishing/burnishing and/or buffing pads. Additionally, one or more side brushes for performing sweeping, dry or wet vacuuming, extracting, scrubbing or other operations can be provided. The maintenance head assembly 130 can extend toward the operating surface 120 on which a maintenance operation is to be performed. For example, the maintenance head assembly 130 can be attached to the base of the surface maintenance machine 100A, 100B such that the head can be lowered to an operating position and raised to a traveling position.

The maintenance head assembly 130 is connected to the surface maintenance machine 100A, 100B using any known mechanism, such as a suspension and lift mechanism such as those illustrated in U.S. Pat. No. 8,584,294 assigned to Tennant Company of Minneapolis, Minn., the disclosure of each of which is hereby incorporated by reference in its entirety. The lift mechanism and suspension allows the maintenance head assembly 130 to be raised and lowered and allows the maintenance tools 131 to conform to undulations in the floor. Such mechanisms include a lift arm, a linear actuator (not shown), and associated coupling structures. Coupling structures include brackets, springs, control arms, and the like for providing controlled pivoting of the linear actuator relative to the deck so as to remain in contact with the operating surface 120 (e.g., when traveling over uneven floor surfaces) when performing a maintenance operation, and be raised to the traveling position when the machine 100A, 100B is not performing a maintenance operation. Components of the lift mechanism and suspension can be operatively coupled to the operator console 166 and/or foot pedals 162, 164 on the operator platform 160.

The maintenance tools 131 can be rotatable relative to the surface 120 on which maintenance is being performed. The maintenance tool can be rotated by rotational force provided by a motive source 133 (e.g., a motor) that can be coupled to the maintenance tool (e.g., using belts, or other motive force transmission systems, not shown) that apply torque and thereby impart a rotational motion on to the maintenance tools 131.

In some embodiments, the interior of the surface maintenance machine 100A, 100B can include a vacuum system (not shown) for removal of debris from the operating surface 120. In such embodiments, the interior can include a fluid source tank (not shown) and a fluid recovery tank (not shown). The fluid source tank can include a fluid source such as a cleaner or sanitizing fluid that can be applied to the operating surface 120 during treating operations. The fluid recovery tank holds recovered fluid source that has been applied to the operating surface 120 and soiled. The interior of the surface maintenance machine 100A, 100B can include passageways (not shown) for passage of debris and dirty liquid. In some such cases, the vacuum system can be fluidly coupled to the recovery tank for drawing dirt, debris or soiled liquid from the operating surface 120. The vacuum system may comprise a vacuum-assisted squeegee 132 mounted to extend from a lower rearward portion of machine 100A, 100B. As was the case with the maintenance head assembly 130, due to the mechanical connection between the squeegee assembly 132 and the maintenance head assembly 130, the squeegee assembly 132 can float relative to machine 100A, 100B to enable the squeegee assembly 132 to remain in contact with surfaces being maintained, even though the surfaces may be somewhat irregular or uneven. Fluid, for example, clean liquid, which may be mixed with a detergent, can be dispensed from the scrubbing fluid tank to the floor beneath machine 100, in proximity to the scrubbing brushes, and soiled scrubbing fluid is drawn by the squeegee centrally, after which it is suctioned via a recovery hose into the recovery tank. Machine 100A, 100B can also include a feedback control system to operate these and other elements of machine 100A, 100B, according to apparatus and methods which are known to those skilled in the art.

In alternative embodiments, the surface maintenance machines 100A, 100B may be combination sweeper and scrubber machines 100A, burnishing or floor polishing machines 100A, trash compactors and the like. In some such embodiments, in addition to the elements describe above, the machines 100A, 100B may either be an air sweeper-scrubber or a mechanical sweeper-scrubber. Such machines 100A, 100B can also include sweeping brushes (e.g., rotary broom) extending toward the operating surface 120 (e.g., from the underside of the machine 100A, 100B), with the sweeping brushes designed to direct dirt and debris into a hopper. In the cases of an air sweeper-scrubber, the machine 100A, 100B can also include a vacuum system for suctioning dirt and debris from the operating surface 120. In still other embodiments, the machine 100A, 100B may be a sweeper. In such embodiments, the machine 100A, 100B may include the elements as described above for a sweeper and scrubber machine 100A, 100B, but would not include the scrubbing elements such as scrubbers, squeegees and fluid storage tanks (for detergent, recovered fluid and clean liquid).

Referencing FIG. 1A, in embodiments where the machine 100 is being operated by an operator, the operator may ride the machine 100A in a seated position in the operator seat 140 located within the operator cab 150. On the other hand, in use, the operator may ride machine 100B shown in FIG. 1B in a standing position and stand on an operator platform 160. The operator platform 160 can optionally include one or more foot pedals 162, 164 for engaging with maintenance tools 131 extending from below the machine 100A, 100B. Alternatively, other types of machines 100A such as walk-behind and tow-behind machines 100A may be used with the disclosed embodiments. In such machines 100A, the operator would be positioned in front of the front surface 112 or behind the rear surface 114 of the machine 100 and apply a pushing or a pulling force to move the machine 100 over the operating surface 120.

Continuing with the illustrated embodiments of FIGS. 1A and 1B, advantageously, the machine 100A, 100B includes an operator console 166 provided on the machine 100A, 100B body. The operator console 166 can include controls for steering, propelling, and controlling various operations of the machine 100A, 100B. The operator console 166 can include speed controls (e.g., such as a knob, not shown) that can control the speed of the machine 100A, 100B. Alternatively, as mentioned previously, the machine 100 can be configured as an autonomous vehicle and may not require any operator intervention to travel over the operating surface 120 and/or perform maintenance tasks thereon.

FIGS. 2-6 illustrate portions of the surface maintenance machine 100 provided with a storage cart 200 according to certain non-limiting exemplary embodiments. The cart 200 can be removably connectable to portions of the surface maintenance machine 100, to provide additional storage for storing a variety of tools and supplies as will be described further below. In some such advantageous embodiments, the cart 200 may permit an operator to remove the cart 200 and transport (e.g., by carrying or rolling) the cart 200 to a location where an additional maintenance operation is to be performed and/or to an area that would be inaccessible by the machines 100A, 100B.

In one example, the cart 200 may be used to service areas such as aisles or passageways (e.g., restrooms with a narrow door opening) that may not permit the machine 100A or machine 100B to pass therethrough. In such cases, the operator may detach the cart 200 from the machine 100, and manually transport the cart 200 and perform a maintenance operation. Alternatively, the area to be serviced may be accessible by the machine 100, but the area on which maintenance is to be performed may be so small that it may be inefficient to use the machine 100 to perform a maintenance operation. While the above examples are provided to illustrate some possible uses of the storage cart 200, the examples should not be viewed as limiting, and other uses of the cart 200 can be envisioned. For instance, the cart 200 could provide auxiliary storage so as to carry and/or replenish cleaning supplies. Alternatively, the cart 200 could carry equipment such as vacuum cleaners (e.g., motorized cleaners such as iMop cleaners and the like).

Figure 2:
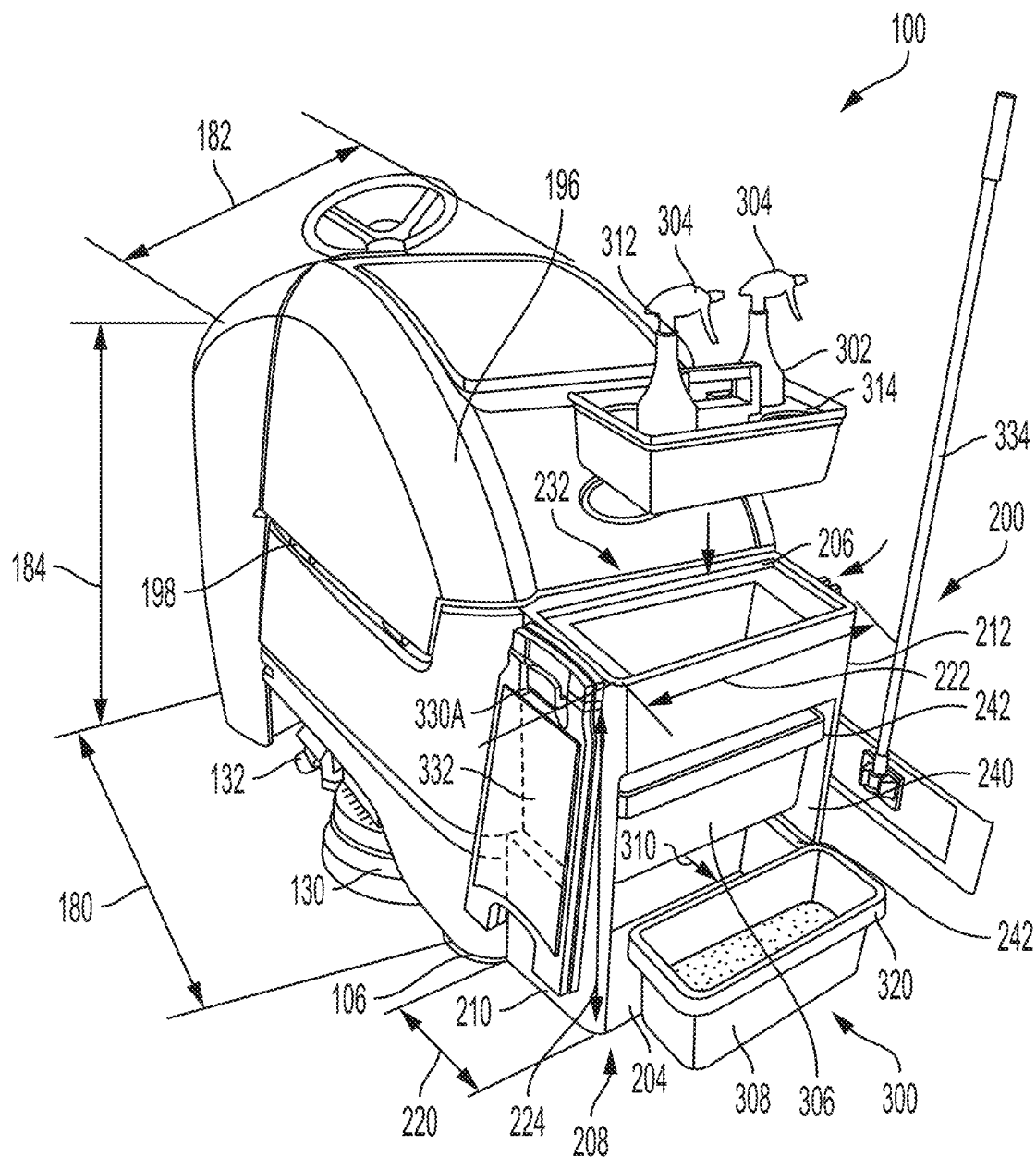
FIG. 2 is a perspective view of a removable cart according to an embodiment removably connected to the surface maintenance machine of FIG. 1A or FIG. 1B.
Figure 3:
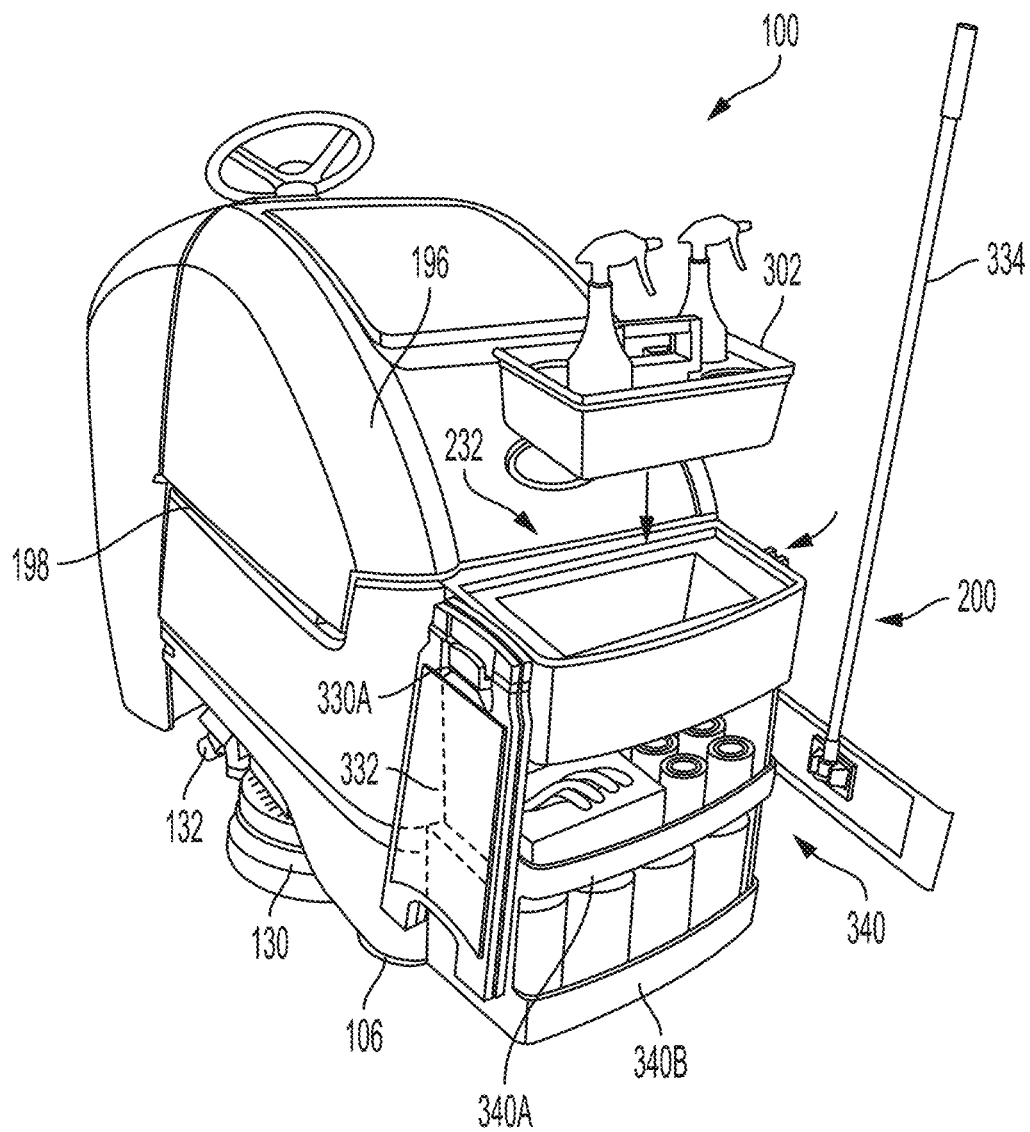
FIG. 3 a perspective view of a removable cart according to another embodiment removably connected to the surface maintenance machine of FIG. 1A or FIG. 1B.
Figure 4:
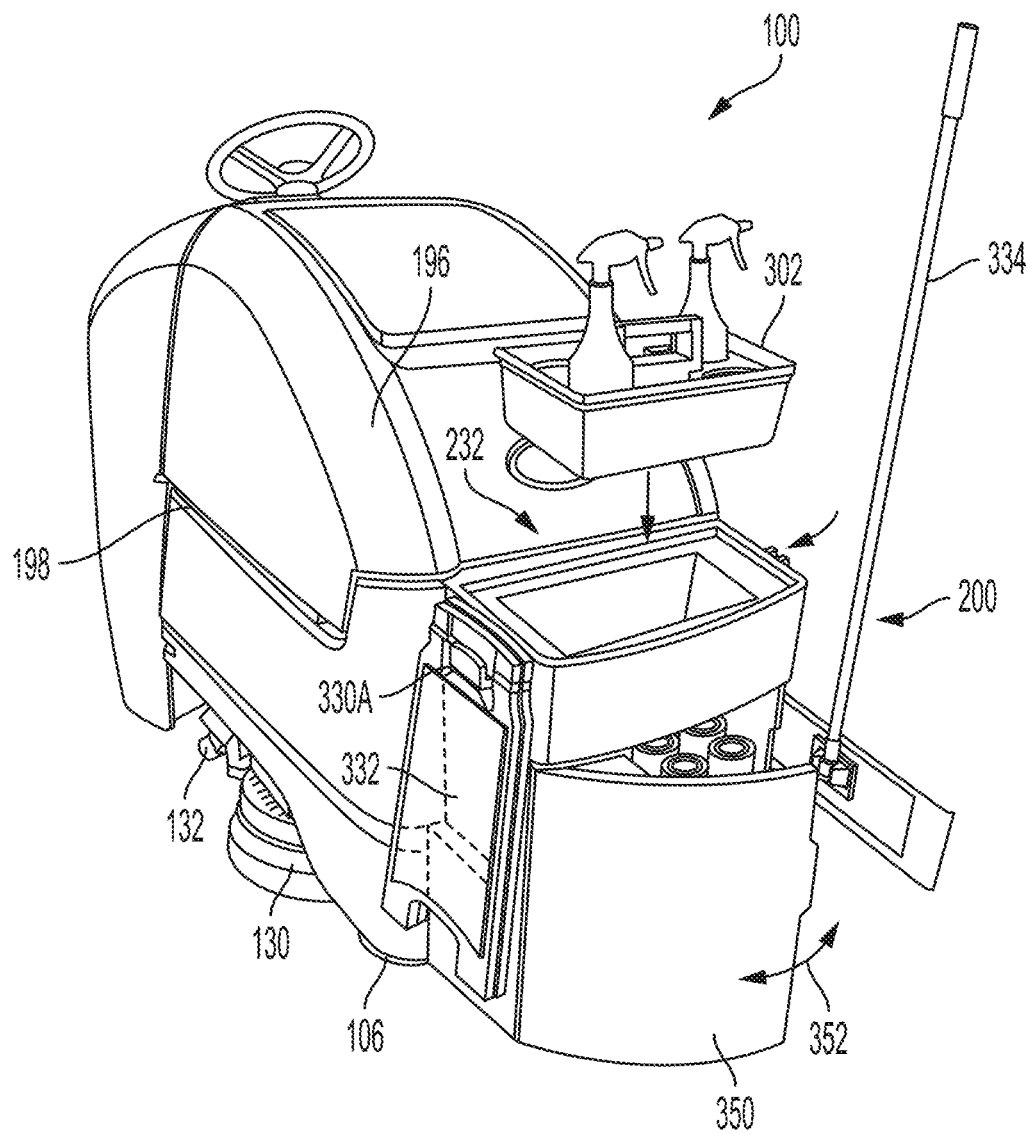
FIG. 4 is a perspective view of a removable cart according to another embodiment removably connected to the surface maintenance machine of FIG. 1A or FIG. 1B.

Referring back to FIGS. 1A and 1B, the mobile body 102 of the surface maintenance machine 100 includes a front surface 112 positioned to the front of the transverse centerline 146 of the machine 100 when the machine 100 moves in the direction 148, and a rear surface 114 positioned to the rear of the transverse centerline 146, when the machine 100 moves in the direction 148. Referring now to FIGS. 2-4, the storage cart 200 is removably connected with the machine 100 so as to extend to the front surface 112 of the machine 100. In some advantageous embodiments, the location of the cart 200 to the front of the transverse centerline 146 may advantageously permit the operator to stand on the rear platform (e.g., illustrated in FIG. 1B). Additionally, such embodiments permit the overall width of the machine 100 to not increase when the cart 200 is positioned to the front, thereby permitting the machine 100 to navigate narrow aisles. However, the cart 200 may be positioned near (or connected to) the rear surface 114 or lateral surfaces 116, 118 in other embodiments.

Referring now to FIG. 2, the cart 200 can be stationary or mobile when removed from the machine 100. In exemplary embodiments where the cart 200 is mobile, the cart 200 may include wheels 202 or casters (best seen in FIG. 4) that support the cart's body 204. In use, the operator may simply detach the cart 200 and roll the cart 200 over the operating surface 120 so as to transport tools and supplies stored in the cart 200 to an area where maintenance is to be performed. Alternatively, the cart 200 may not include wheels. In such cases, the operator would detach the cart 200 and manually carry the cart 200 (and/or storage components 300 thereof) to perform a maintenance operation. Accordingly, as used herein, the term "cart 200" should be understood to include embodiments that include wheels supporting a hollow body portion of the cart 200 as well as embodiments that do not include wheels.

As is apparent from FIGS. 2-6, the cart 200 can have a top surface 206, a bottom surface 208 opposite to the top surface 206, lateral surfaces 210, 212, and a rear surface 214. In the illustrated embodiment, the front portion of the cart 200 is generally open so as to facilitate ease of access of items stored in the cart 200, though, as seen in FIG. 4, an access door 350 may form a front surface in some embodiments. The cart 200 may be positioned such that the bottom surface 208 of the cart 200 is suspended above the operating surface 120 on which the machine 100 is operated. For instance, the bottom surface 208 of the cart 200 may be situated above a plane 170 containing a center of at least one wheel of the surface maintenance machine 100. In embodiments where the cart 200 is provided with its own wheels, the wheels 202 of the cart 200 may be situated above a plane 170 containing a center of at least one wheel of the surface maintenance machine 100. Advantageously, such embodiments permit the cart 200 to travel along with the machine 100 without leaving any scuff marks on the floor. Alternatively, the cart 200 can be positioned at desired position relative to the operating surface 120 on which the machine 100 is positioned (and/or travels). For instance, the wheels 202 of the cart 200 may be positioned below the plane 170, but may not contact the operating surface 120 on which the machine 100 is positioned (and/or travels). Alternatively, the wheels 202 of the cart 200 may contact and/or roll on the operating surface 120 on which the machine 100 is positioned (and/or travels).

Continuing with FIGS. 2-6, the cart 200 can have dimensions less than the dimensions of the surface maintenance machine 100. The cart 200 can have a cart depth 220, a cart width 222 and a cart height 224. The cart depth 220 can be less than machine depth 180, the cart width 222 can be less than or equal to machine width 182 and cart height 224 can be less than machine height 184. Such embodiments can be advantageous, as they may permit line of sight when driven by an operator and/or may not add to the machine 100 envelope thereby permitting operation in narrow aisles and doorways. In alternative embodiments, the cart depth 220 can be greater than machine depth 180, the cart width 222 can be greater than machine width 182 and cart height 224 can be greater than machine height 184, and the exemplary dimensions illustrated herein should not be construed as limiting.

Figure 6:
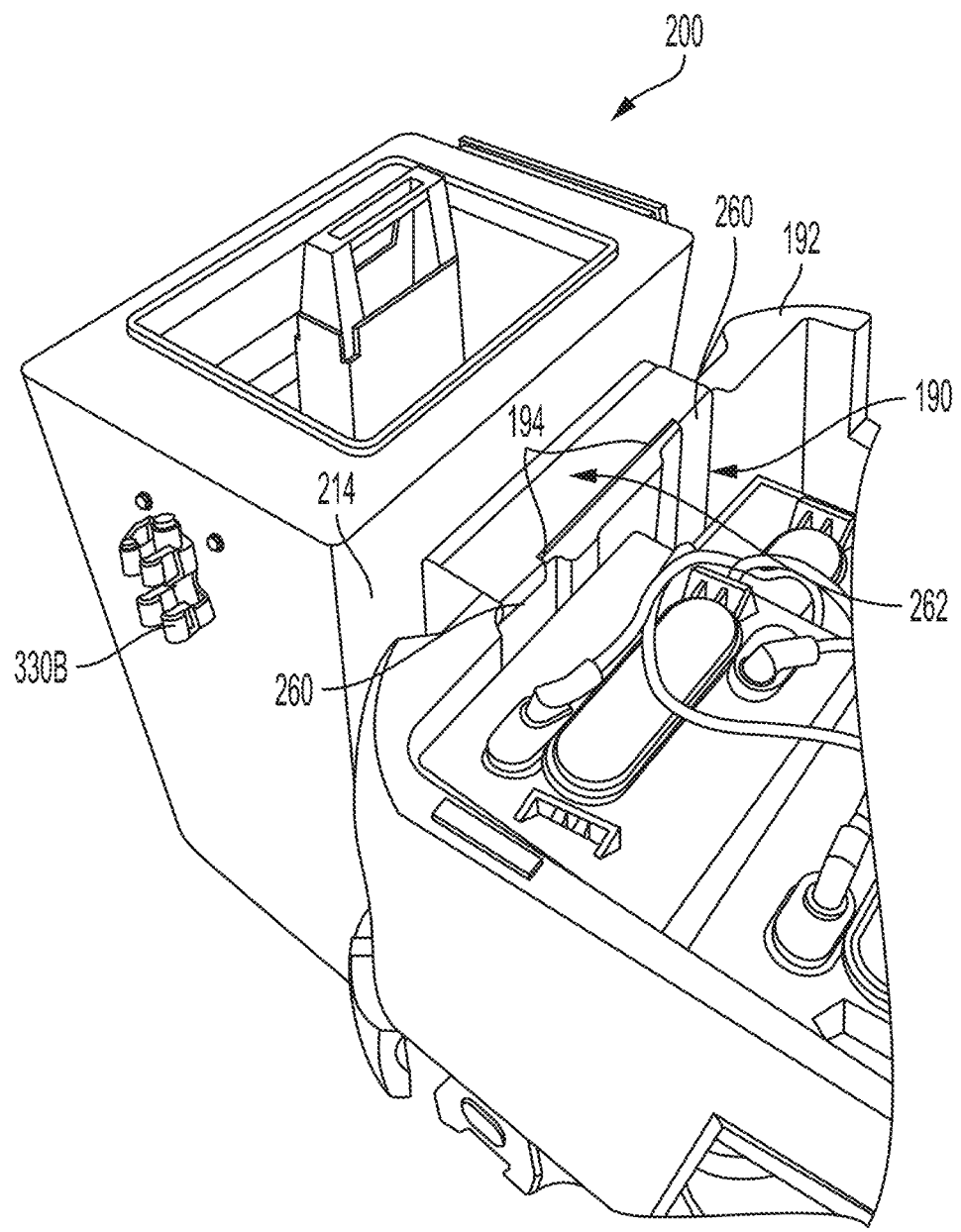
FIG. 6 is another enlarged perspective view of the removable cart of FIGS. 2-4.

Referring now to FIGS. 2 and 3, the cart 200 can optionally include modular storage components 300. In the illustrated embodiment of FIG. 2, the cart 200 includes a top surface 206 having a central opening 232. The storage components 300 can include a removable caddy 302 for housing one or more spray bottles 304, a storage bin 306 that is slidably coupled relative to the cart 200, and a bucket 308 removably (e.g., slidable along direction 310) coupled to the cart 200. Additional or fewer storage components 300 such as bins, caddies, trays and the like for storing surface maintenance tools 130 and supplies that an operator may use for performing one or more manual surface maintenance tasks are contemplated. The removable caddy 302 can be positioned in the central opening 232 and can engage therewith by a friction fit. The removable caddy 302 may include a handle 312 that can permit the caddy to be lifted relative to the central opening 232 and carried to a desired location. The caddy can include holders 314 sized and shaped to receive spray bottles 304 (e.g., as illustrated in FIGS. 2-4) and permit the spray bottles 304 to be securely held when the machine 100 and/or the caddy is being transported. Alternatively, supplies and tools other than a bottle can be stored in the caddy as illustrated in FIGS. 5 and 6.

In some such embodiments, the cart 200 can be configured so as to be modular. For instance, the interior surface 240 of the cart 200 can include a plurality of variably positionable fasteners 242 (e.g., slider rails 242, pegs, screws and the like that can support storage components 300) that can be positioned anywhere along the interior surface 240 of the cart 200 so as to attach bins, buckets, trays, etc., of different sizes. In an example, the interior surface 240 of the hollow body portion of the cart 200 may include a slider rail 242. In the illustrated embodiment of FIG. 2, the storage components 300 may include a lip surface 320 that can rest on the slider rail 242 and slide along the slider rail 242 as shown by the arrow 310. Optionally, the storage components 300 may attach to a roller system having rollers that can roll along the slider rail 242 to permit ease of sliding of the storage components 300 with respect to the cart 200.

The slider rail 242 can be positioned at any location on the interior surface 240 to accommodate a given sized storage component 300 (e.g., bin or tray). In FIG. 2, two storage components 300 (e.g., a bin and a bucket 308) are provided below the removable caddy 302. Corresponding slider rails 242 are provided for each storage component, and positioned within the interior surface 240 of the cart 200 so as to permit ease of removal of the storage components 300 and/or items stored therein. The slider rails 242 are located such that each storage component can slide without interfering with adjacent storage components 300. The slidability of the storage components 300 permit ease of access of tools, supplies or accessories stored therewithin. Appreciably, the modular engagement of various storage components 300 increase storage capacity of the cart 200 without increasing the footprint of the cart 200.

With continued reference to FIG. 2, the cart 200 includes fasteners (e.g., hooks, clips and the like) to removably attach supplies or tools to the cart 200. For instance, in the illustrated embodiment, the cart 200 includes a first fastener 330A positioned on a lateral surface, and a second fastener 330B on an opposite lateral surface. The first fastener 330A can be a hook for hanging signage 332 (e.g., warning, wet floor etc.), trash bags, and the like. The second fastener 330B can also be a hook in some embodiments. Alternatively, as illustrated, the second fastener 330B can be a clip that can permit a broom or a mop 334 to be removably connectable to the cart 200. Additional or fewer fasteners are contemplated within the scope of the present disclosure.

FIG. 3 illustrates another exemplary embodiment of the storage cart 200. The embodiment illustrated in FIG. 3 is substantially similar to that illustrated in FIG. 2. However, as seen in FIG. 3, the cart 200 includes a plurality of storage trays 340 each of which define a shelf surface for storing items. The trays can store maintenance supplies (e.g., paper products, wash cloths, etc.). As described previously with respect to FIG. 2, a pair of slider rails 242 can be provided for each storage tray 340 to slidably move the storage tray 340. The storage trays 340 can be attached to the interior surface 240 of the cart 200 at a location so as to provide an adequate storage area for each tray. For instance, the first storage tray 340A can be positioned at a predetermined distance below the second tray 340B such that the first storage tray 340A can store storage supplies that can be easily removed. Similarly, the second storage tray 340B can be positioned at a predetermined distance below the removable caddy 302 such that the second storage tray 340B can store storage supplies (e.g., paper towels) that can be easily removed. While two trays are illustrated, additional or fewer trays are contemplated within the scope of the present disclosure.

Referring now to FIG. 4, the cart 200 can optionally include an access door 350. The access door 350 can permit access to the storage components 300 when opened. In the illustrated embodiment, the access door 350 can open in a lateral direction 352. Such embodiments can permit the cart 200 to have a less cluttered appearance.

As described previously, the cart 200 can be removably connected to the machine 100A, 100B. In an example, the cart 200 and portions of the surface maintenance machine 100A, 100B may include complementary fasteners. Alternatively, the cart 200 and the surface maintenance machine 100A, 100B may engage with each other by a friction fit. FIGS. 5 and 6 illustrate enlarged detailed views of the cart 200 attached to a portion of the surface maintenance machine 100A, 100B and illustrate one such connection between the cart 200 and the surface maintenance machine 100A, 100B. As seen therein, the machine 100 may include a generally hollow compartment 190 for housing one or more on-board power sources (e.g., batteries 191). The hollow compartment 190 may be provided to the front, rear or located laterally along the machine 100 and can adjoin at least one of the front surface 112, the rear surface 114 and lateral surfaces 116, 118. The hollow compartment 190 can thereby permit connection of the cart 200 to front, rear or lateral portions of the machine 100 as mentioned previously. In some such cases, the hollow compartment 190 can be surrounded by a rim 192. The rim 192 can include one or more recesses 194 for structural rigidity so as to support the weight of power sources stored in the hollow compartment 190. In the illustrated embodiment, the machine 100 includes two recesses 194. Additional or fewer recesses 194 are contemplated within the scope of the present disclosure.

With continued reference to FIG. 6, the cart 200 includes a pair of corresponding tabs 260 attached to a rear surface 214 thereof. The tabs 260 can be integrally formed with a ledge 262 attached to the rear surface 214 of the cart 200.

Each tab 260 can be received within a corresponding recess 194. When the tabs 260 are received within the recess 194, the ledge 262 of the cart 200 may contact portions of the rim 192 of the hollow compartment 190 as illustrated in FIG. 6. While two tabs 260 are illustrated, additional or fewer tabs 260 are contemplated within the scope of the present disclosure. The cart 200, when connected to the surface maintenance machine 100, can thus be non-slidable and/or immovable relative to the machine 100, and can thus securely engage with the machine 100. As seen from FIG. 6, at least portions of the rear surface 214 contact the surface that adjoins the hollow compartment 190 (e.g., front surface 112, rear surface 114 or lateral surfaces 116, 118) of the surface maintenance machine 100. In use, when it is desired to detach the cart 200 from the machine 100, the tabs 260 may be slid (e.g., along arrows 262) from the recess 194, thereby decoupling the cart 200 from the machine 100. The cart 200 may be movable relative to the machine 100 once detached.

With continued reference to FIGS. 5 and 6, in some illustrative embodiments, the hollow compartment 190 of the machine 100 may be enclosed by an access panel 196 of the body of the machine 100. The access panel 196 may be hingedly coupled to the body of the machine 100, and can move between an open position (shown in FIGS. 5 and 6), and a closed position (shown in FIGS. 1A-4). A plurality of hinges 198 may be provided (e.g., laterally or on other portions) on the surface maintenance machine 100 to move the access panel 196 between the open position and the closed position in a hinged fashion.

When the access panel 196 is in the closed position, in some cases, portions of the rim 192 and/or ledge 262 of the cart 200 may not be accessible, and thus the cart 200 may not be removable. Accordingly, in such embodiments, in use, the access panel 196 may have to be opened first before detaching the tabs 260 from the recesses 194 to remove the cart 200. Such embodiments may improve the engagement between the cart 200 and the machine 100 and provide a more secure connection therebetween.

While FIG. 6 illustrated tabs 260 and recesses 194 to connect the cart 200 to the machine 100, the specific type of connection therebetween should not be construed as limiting. FIGS. 7A-13 illustrate a portion of the surface maintenance machine 100 with a cart 200 attached thereto according to various embodiments. Such embodiments can advantageously permit detaching the cart 200 from the machine 100 without necessitating that body portions (e.g., access panel) of the machine 100 be opened.

Figure 7B:
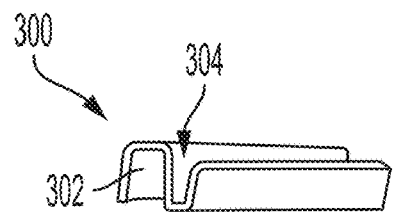
FIGS. 7B and 7C are each perspective views of a connector shown in FIG. 7A according to an embodiment.
Figure 7C:
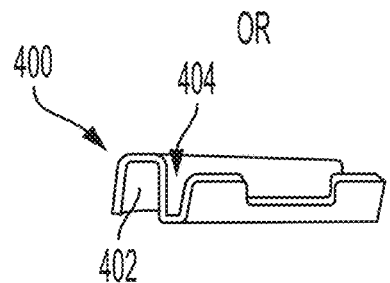
Figure 7A:
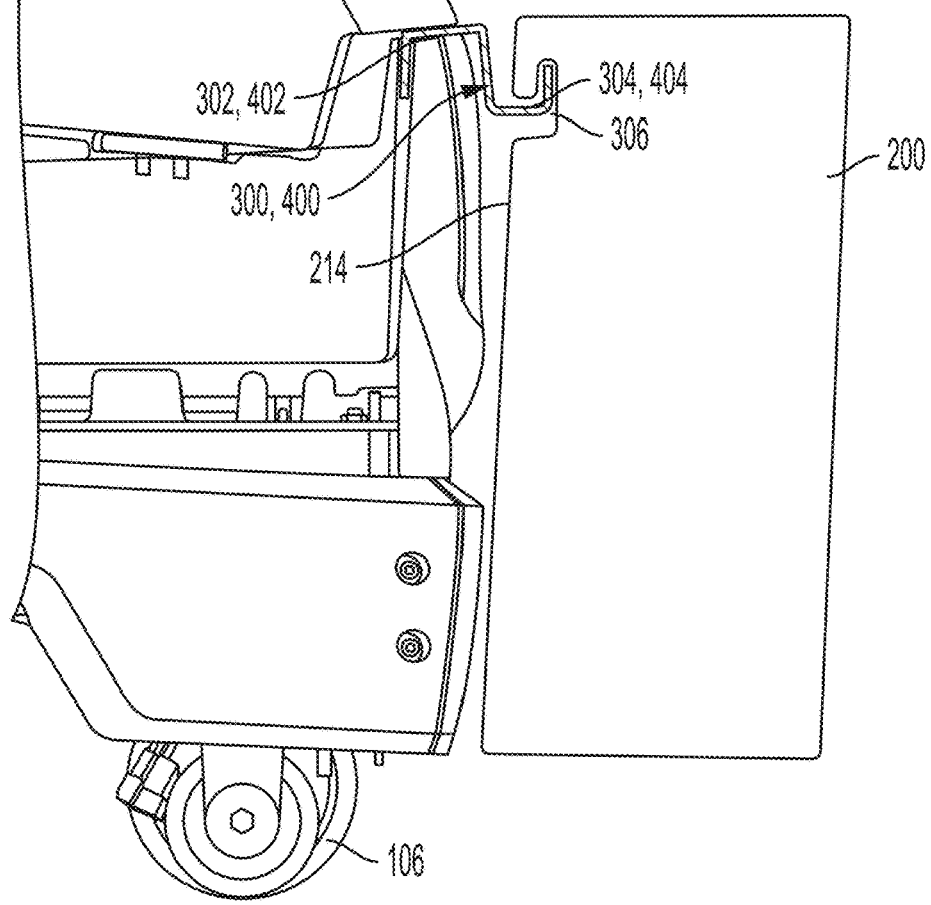
FIG. 7A is a view of a portion of the surface maintenance machine of FIG. 1A or FIG. 1B, connected to the removable cart of FIGS. 2-4 according to another embodiment.

With reference to FIGS. 7A-7C, a bracket 300 or 400 can be provided to connect the cart 200 to the surface maintenance machine 100. In some such embodiments, the rear surface 214 of the cart 200 can engage with the bracket 300, 400 in a complementary fashion. In one example, the bracket 300, 400 can have a curved surface that defines a pair of grooves 302, 304 (or 402 404). A first groove (302 or 402) can engage with a body panel of the surface maintenance machine 100, while the second groove (304 or 404) can engage with a slot 306 defined on a rear surface 214 of the cart 200. FIGS. 7B and 7C illustrate two such brackets 300, 400 that can permit such a connection between the machine 100 and the cart 200. It should be understood that the shape, size and position of the bracket and corresponding slots in the machine 100 and the cart 200 are illustrative, and should not be construed as limiting. While not illustrated, an optional lower support member can be provided to receive and support the cart 200, as will be described with respect to FIG. 9.

Figure 8B:
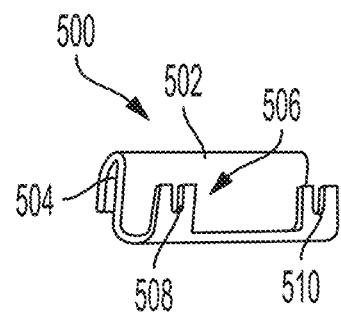
FIGS. 8B and 8C are perspective and side views of a connector shown in FIG. 8A.
Figure 8A:
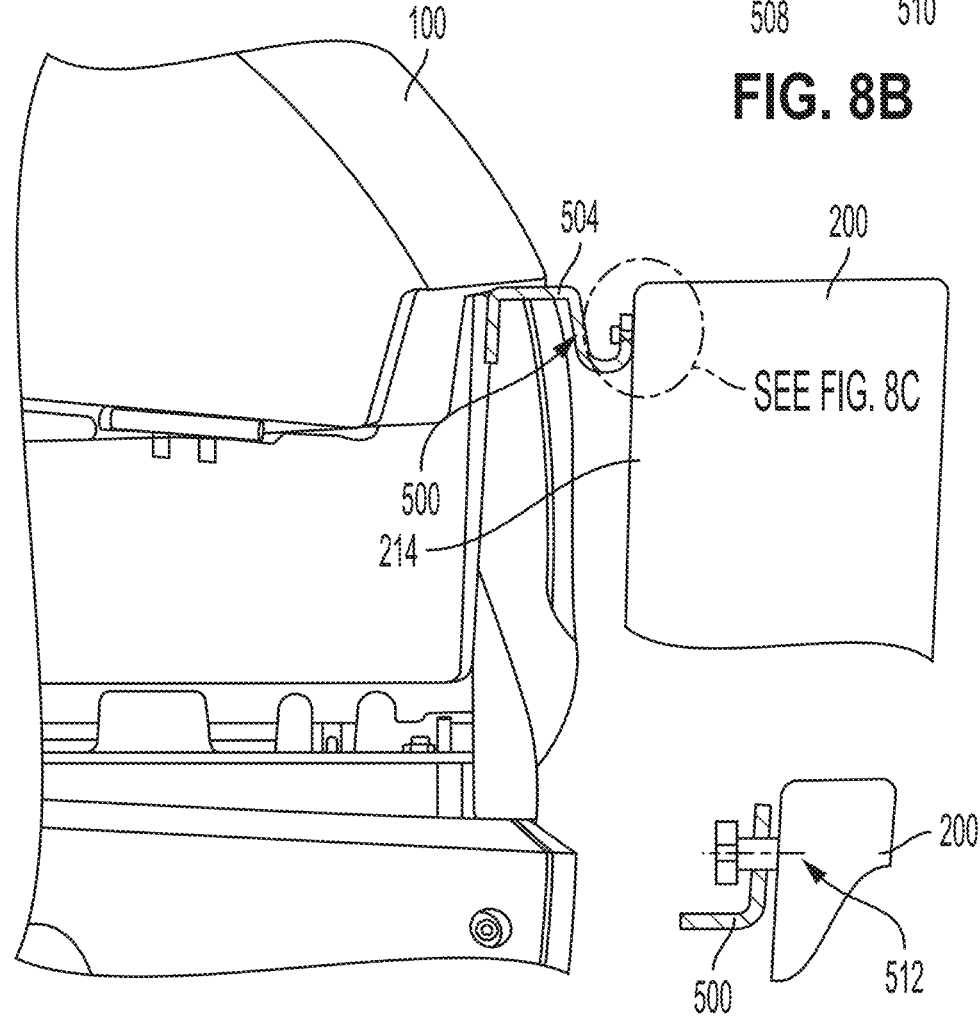
FIG. 8A is a view of a portion of the surface maintenance machine of FIG. 1A or FIG. 1B, connected to the removable cart of FIGS. 2-4 according to another embodiment.
Figure 8C:
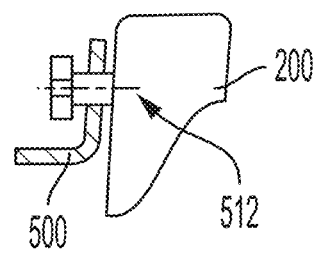

With reference to FIGS. 8A-8C, a bracket 500 can be provided to connect the cart 200 to the surface maintenance machine 100. In some such embodiments, a rear surface 214 of the cart 200 can engage with the bracket 500 by way of a fastened connection, as illustrated in FIG. 8C. In one example, the bracket 500 can have a curved surface 502 that defines a pair of grooves. A first groove 504 can engage with a slot in a body panel of the surface maintenance machine 100, while the second groove 506 can be shaped so as to permit a bolted connection (via bolt recesses 508, 510) to the rear surface of the cart 200. A shoulder bolt 512 or a similar fastener can be received in the bolt recesses 508, 510 to connect the cart 200 to the machine 100. It should be understood that the shape, size and position of the bracket and corresponding slots in the machine 100 and the cart 200 are illustrative, and should not be construed as limiting. While not illustrated, an optional lower support member can be provided to receive and support the cart 200, as will be described with respect to FIG. 9.

Figure 9:
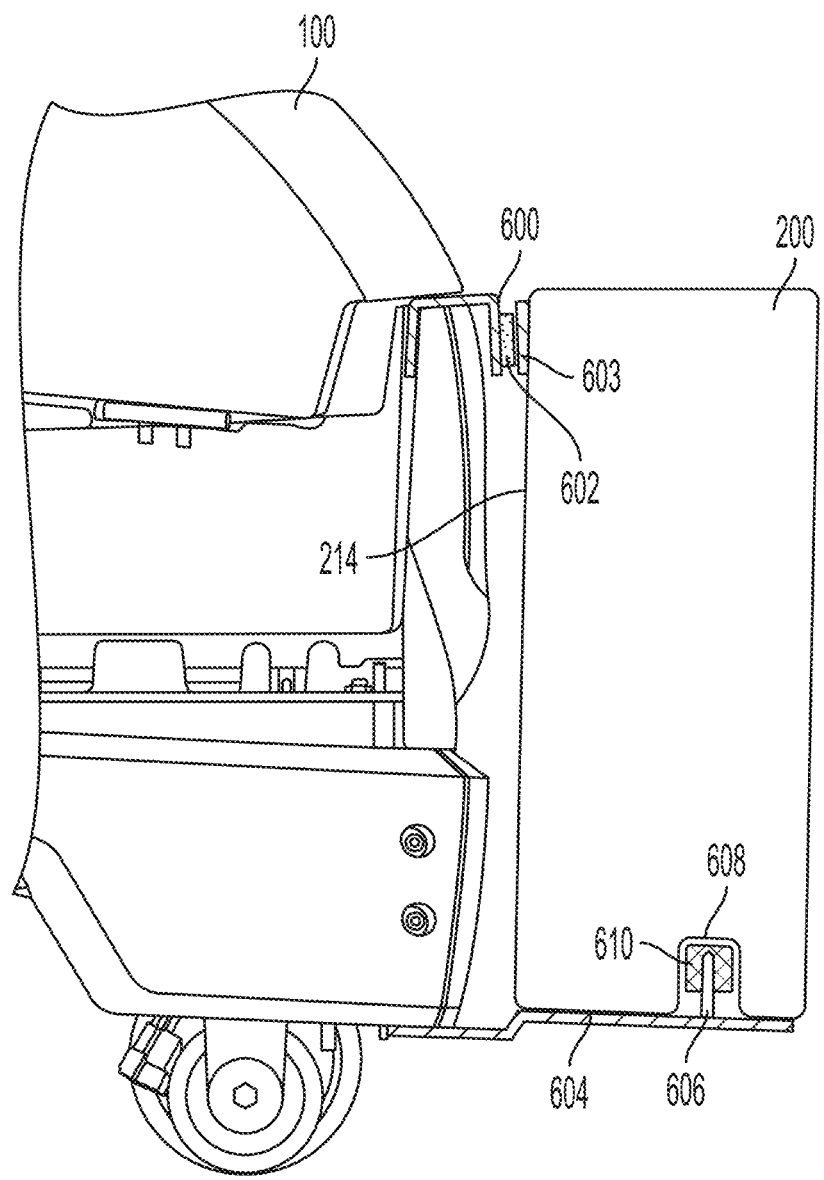
FIG. 9 is a view of a portion of the surface maintenance machine of FIG. 1A or FIG. 1B, connected to the removable cart of FIGS. 2-4 according to another embodiment.

Referring now to FIG. 9, a magnetic bracket 600 can be provided to connect the cart 200 to the surface maintenance machine 100. In some such embodiments, a portion of the rear surface 214 of the cart 200 can engage with the bracket 600 by way of one or more magnets 602. In some embodiments, the rear surface 214 of the cart 200 can include a component 603 that can be responsive to a magnetic force of the magnet 602. In the illustrated example, the component 603 is a steel plate, though, other shapes and materials are contemplated in the present disclosure. With continued reference to FIG. 9, in certain exemplary embodiments, a lower bracket 604 can extend from a lower surface of the surface maintenance machine 100. The lower bracket 604 can provide additional support to the cart 200. In some such advantageous embodiments, the lower bracket 604 can include a locating pin 606 to permit mounting the cart 200 on to the lower bracket 604 so as to permit the component 603 to engage with the magnet 602. Correspondingly, the lower portion of the cart 200 can include a groove 608 to receive the locating pin. Optional cushioning 610 may surround any additional space between the groove and the locating pin.

FIGS. 10A-10D illustrate another embodiment of a connector 700 to connect the cart 200 to the surface maintenance machine 100. The connector 700 includes a pair of brackets 702 and 704. In the illustrated embodiment, the bracket 702 can engage (e.g., fastened, welded, hooked, and the like) to a portion of the surface maintenance machine 100. The bracket 704 can engage (e.g., fastened, welded, hooked, and the like) to a portion (e.g., rear, front, sides, etc.) of the cart 200. As seen in the detail views of FIGS. 10B and 10D, the bracket 702 can have an opening 706 for receiving a portion of the bracket 704. The opening 706 is illustrated as having a rectangular shape. As seen in FIG. 10C, the bracket 704 can have a ledge 708 that can rest against a bottom edge 710 of the opening 706, thereby connecting the bracket 704 to the bracket 702. The bracket 704 can be disengaged from the bracket 702 by removing the ledge 708 from the opening 706. Other shapes of the opening 706 are contemplated. Likewise, the ledge 708 can rest against other edges (sides, top, etc.) of the opening 706. While not illustrated, an optional lower support member can be provided to receive and support the cart 200, similar to that illustrated in FIG. 9.

Figure 11A:
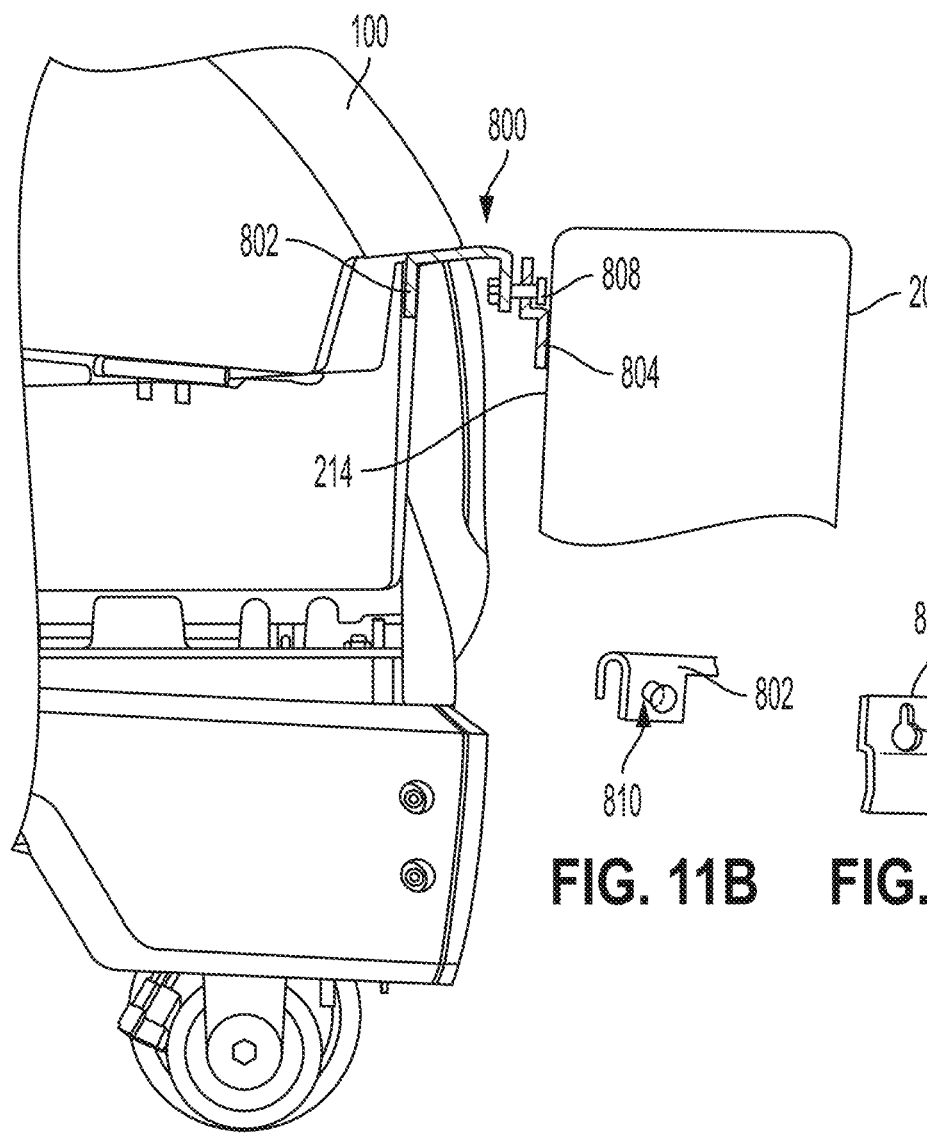
FIG. 11A is a view of a portion of the surface maintenance machine of FIG. 1A or FIG. 1B, connected to the removable cart of FIGS. 2-4 according to another embodiment.

FIGS. 11A-11C illustrate another embodiment of a connector 800 to connect the cart 200 to the surface maintenance machine 100. The connector 800 comprises a pair of brackets 802, 804. In the illustrated embodiment, the bracket 802 can engage (e.g., fastened, welded, hooked, and the like) to a portion of the surface maintenance machine 100. The bracket 804 can engage (e.g., fastened, welded, hooked, and the like) to a portion (e.g., rear, front, sides, etc.) of the cart 200. As seen in the detail views of FIGS. 11B and 11C, the bracket 804 can have an opening 806 for receiving a fastener 808. As seen in FIG. 11C, the opening 806 is illustrated as an eyelet (e.g., shaped like a keyhole), though, other shapes of the opening 806 are contemplated. The bracket 802 also has an opening 810, for receiving the fastener 808. Many different types of fasteners can connect the bracket 802 to the bracket 804. For instance, a shoulder bolt can be inserted through the opening 808 and 810, thereby engaging the bracket 802 with the bracket 804, and thus permitting the cart 200 to be attached to the machine 100. While not illustrated, an optional lower support member can be provided to receive and support the cart 200, similar to that illustrated in FIG. 9.

Figure 12:
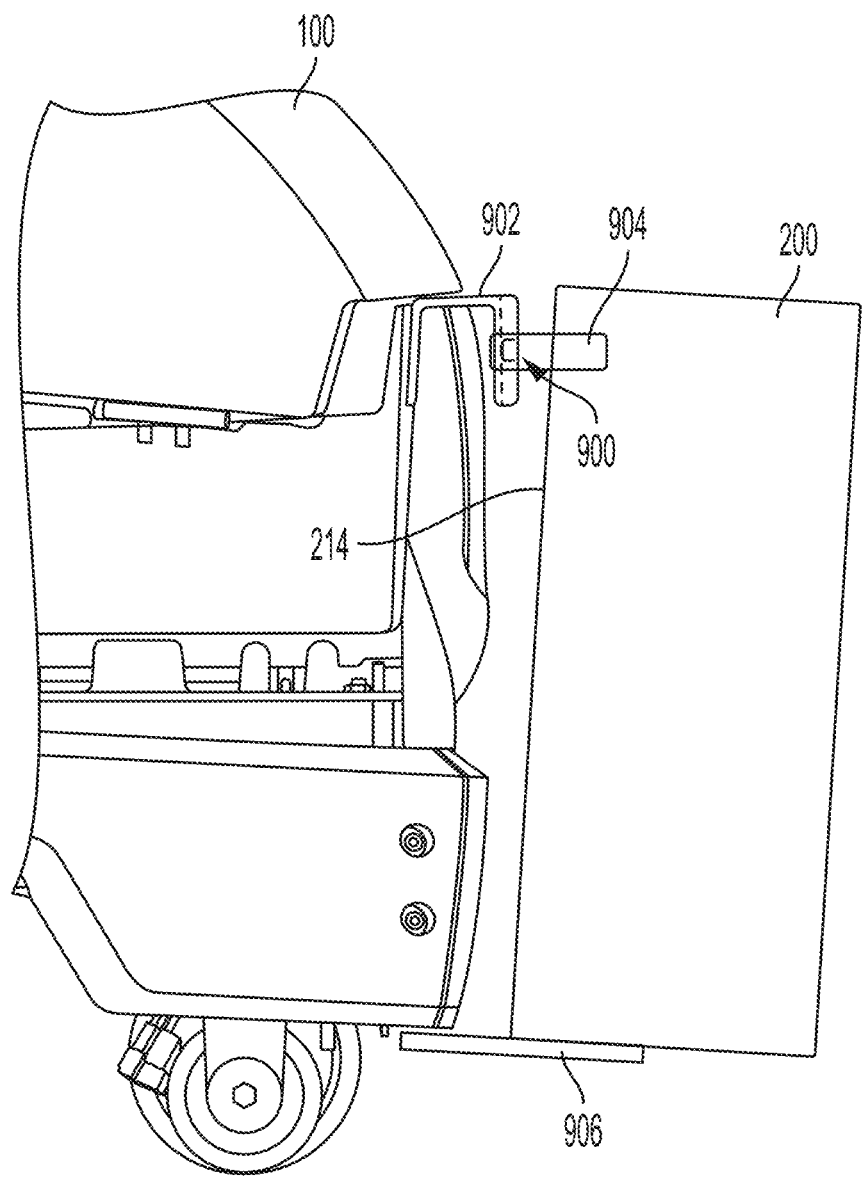
FIG. 12 is a view of a portion of the surface maintenance machine of FIG. 1A or FIG. 1B, connected to the removable cart of FIGS. 2-4 according to another embodiment.

FIG. 12 illustrates another embodiment of a connector 900 to connect the cart 200 to the surface maintenance machine 100. A bracket 902 can engage with a portion of the machine 100, as described previously with respect to FIGS. 7A-11C. In addition, in FIG. 12, the connector 900 can include a latch 904 that can engage with the bracket 902. Many different types of latches are contemplated. For instance, the latch 904 can be a draw latch, though, other types of latches such as push-to-open, pull-to-open and the like are contemplated. Advantageously, the embodiment of FIG. 12 is illustrated with a lower support plate 906, similar to that illustrated in FIG. 9.

Figure 13:
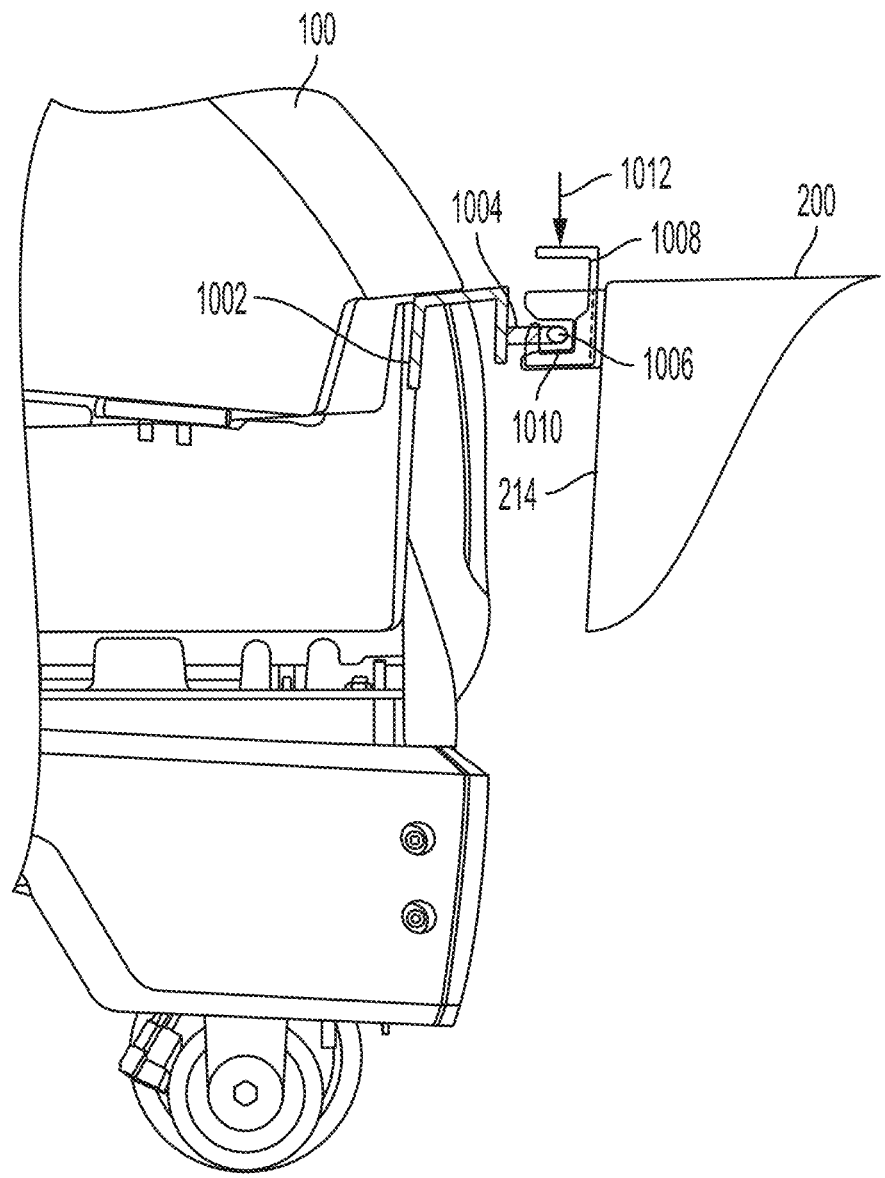
FIG. 13 is a view of a portion of the surface maintenance machine of FIG. 1A or FIG. 1B, connected to the removable cart of FIGS. 2-4 according to another embodiment.

FIG. 13 illustrates another embodiment of a connector 1000 to connect the cart 200 to the surface maintenance machine 100. A bracket 1002 can engage with a portion of the machine 100, as described previously with respect to FIGS. 7A-12. However, the bracket 1002 can include a pin 1004 that terminates in a rounded tip 1006. A bracket 1008 can include a slot 1010 that can receive the rounded edge 1006 of the pin to lock the brackets 1002, 1008 together, thereby engaging the cart 200 to the machine 100. The pin 1004 and/or brackets 1002, 1008 can be spring-biased such that the pin is received in the slot 1010. During use, a force 1012 can be applied to overcome the spring-bias and thereby disconnect the latch. Many different types of brackets 1002, 1008 are contemplated and the shapes illustrated in FIG. 13 should not be construed as limiting. For instance, FIG. 13 illustrates to possible shapes of the bracket 1008 in blue and red lines. Other shapes of brackets 1008 are contemplated.

FIGS. 14-22 illustrate a surface maintenance machine 100 with a cart 200 according to another embodiment. The surface maintenance machine 100 illustrated in FIGS. 14-22 is substantially similar to those illustrated in FIGS. 1 and 2 and therefore a description thereof is omitted for brevity. Further, the cart 200 shown in FIGS. 14-22 can be substantially similar to the cart 200 illustrated in FIGS. 3-13, except that the wheels of the cart 200 can substantially contact the operating surface on which the machine 100 is traveling. Additionally, the cart 200 can be permitted to have limited motion relative to the surface maintenance machine 100 when the cart 200 is connected to the machine 100, as will be described further below with respect to FIGS. 14-22.

Figure 14:
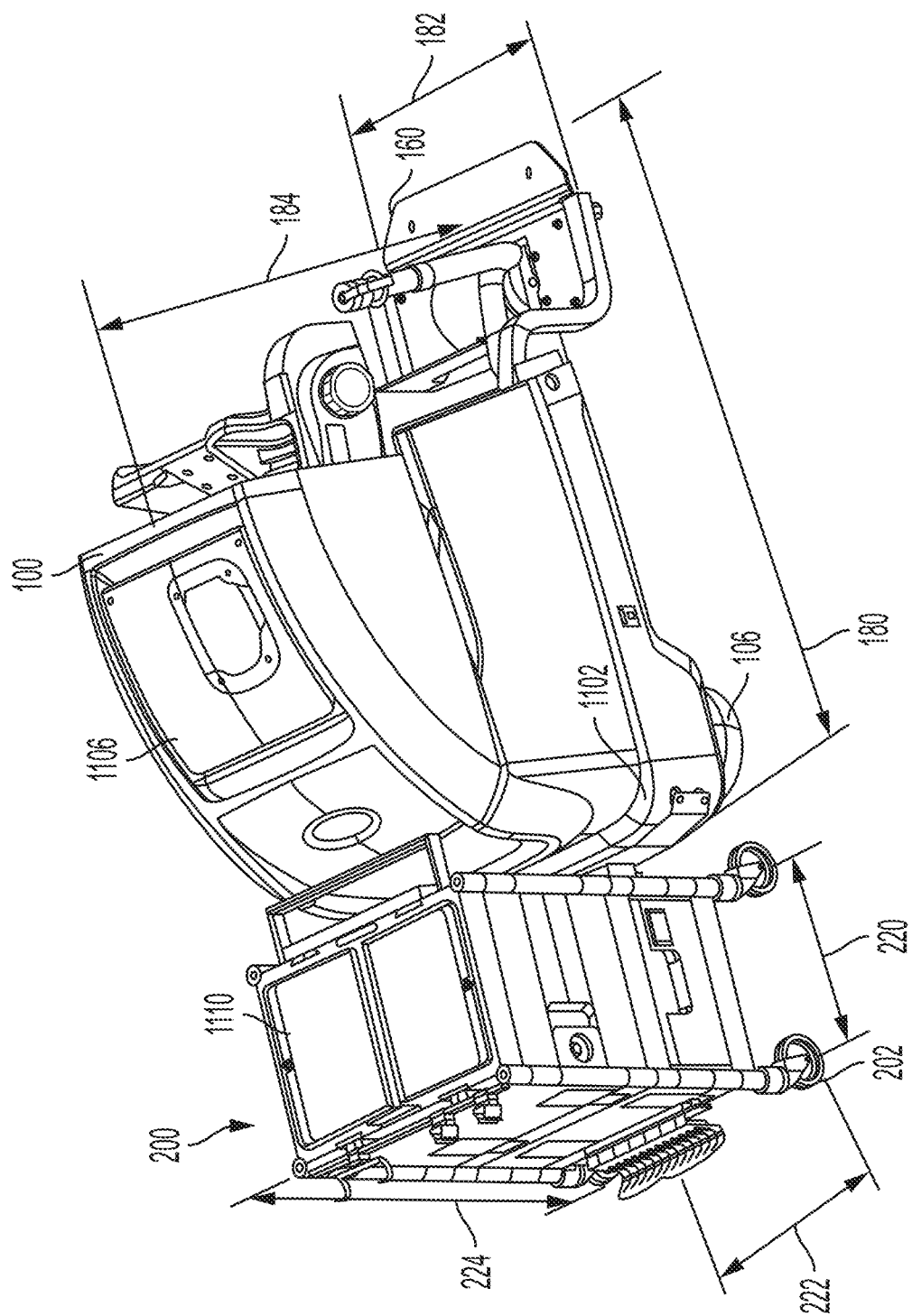
FIG. 14 is a perspective view of a surface maintenance machine with a removable cart attached thereto according to another embodiment.
Figure 15:
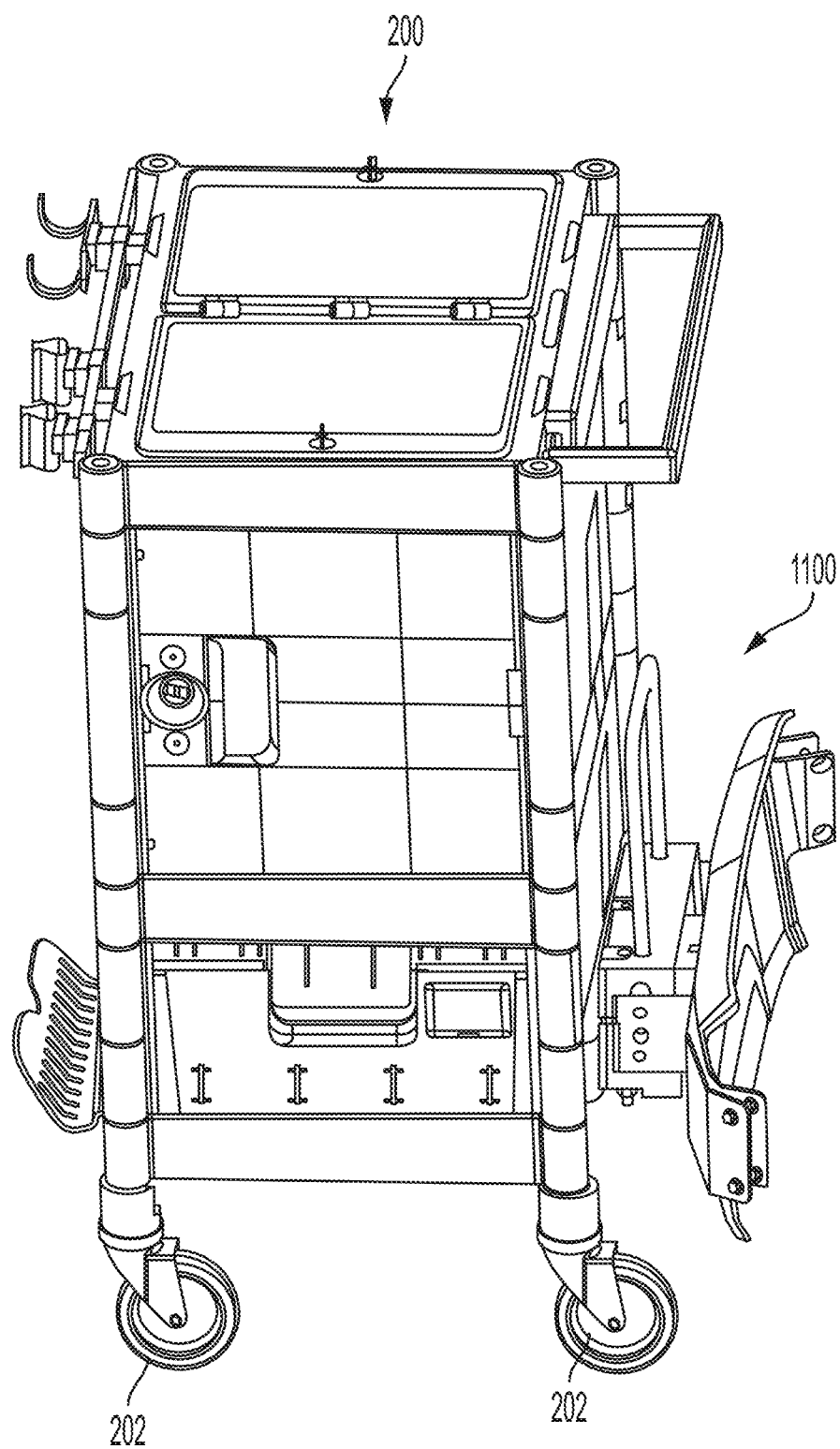
FIG. 15 is a perspective view of the removable cart shown in FIG. 14 and a coupling mechanism for coupling the cart to the machine shown in FIG. 14.

Referencing FIGS. 14 and 15, the cart 200 is removably coupled to the surface maintenance machine 100 by a coupling mechanism 1100. In the illustrated embodiment, the coupling mechanism 1100 is coupled to the front surface of the surface maintenance machine 100. In one such embodiment, the coupling mechanism 1100 is coupled to a front shroud 1102 of the machine 100. Alternatively, in other embodiments, the coupling mechanism 1100 can be positioned and/or coupled to other parts of the surface maintenance machine 100, for instance, the rear surface opposite to the front surface or lateral surfaces positioned laterally to the front surface and/or rear surface.

As seen from FIG. 14, the coupling mechanism 1100 can be located suitably on the surface maintenance machine 100 for maneuverability. For instance, in an example, the coupling mechanism 1100 can be positioned and/or coupled to the bottom portion of the front surface of the machine 100 such that when the cart 200 is connected to the machine 100, the cart 200 may not impede the line of sight of an operator standing on the operator platform (or seated in an operator cab) of the machine 100. Accordingly, in some such embodiments, the positioning of the coupling mechanism 1100 on the machine 100 may be such that an uppermost surface 1106 of the storage cart 200 is more proximal to the operating surface than an uppermost surface 1110 of the surface maintenance machine 100.

In addition, as was the case with embodiments of the cart 200 of FIGS. 3-13, certain embodiments of the cart 200 of FIGS. 14-22 can have dimensions less than the dimensions of the surface maintenance machine 100. The cart 200 can have a cart depth 220, a cart width 222 and a cart height 224. The cart depth 220 can be less than machine depth 180, the cart width 222 can be less than or equal to machine width 182 and cart height 224 can be less than machine height 184. Such embodiments can be advantageous, as they may permit line of sight when driven by an operator and/or may not add to the machine 100 envelope thereby permitting operation in narrow aisles and doorways. In alternative embodiments, the cart depth 220 can be greater than machine depth 180, the cart width 222 can be greater than machine width 182 and cart height 224 can be greater than machine height 184, and the exemplary dimensions illustrated herein should not be construed as limiting.

Figure 16:
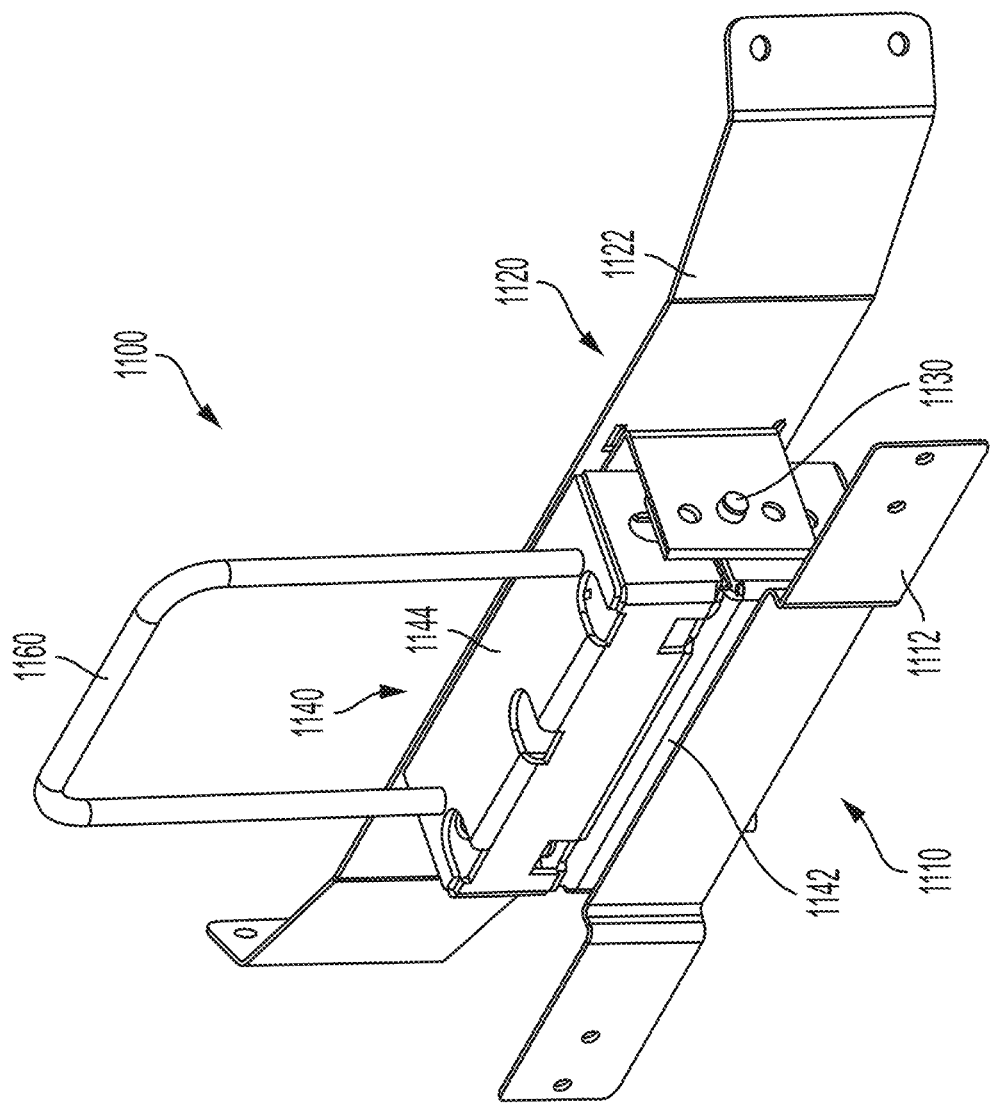
FIG. 16 is a perspective view of the coupling mechanism shown in FIG. 14.

FIGS. 15 and 16 illustrate various features of the coupling mechanism 1100. The coupling mechanism 1100 can removably couple the storage cart 200 to the surface maintenance machine 100. The coupling mechanism 1100 can control movements of the storage cart 200 relative to the surface maintenance machine 100 such that the wheels 202 of the storage cart 200 may substantially contact the operating surface when the cart 200 remains connected to the surface maintenance machine 100. In certain advantageous aspects, the coupling mechanism 1100 can provide a floating connection between the storage cart 200 and the surface maintenance machine 100 such that the cart 200 does not tip over, for instance, when the machine 100 is traveling on uneven surfaces or on ramps. Further, in some such advantageous aspects, the cart 200 remains generally parallel to the operating surface when connected to and traveling with the surface maintenance machine 100 over uneven surfaces. Such embodiments can advantageously ensure that contents stored in the cart 200 generally remain in their position when the machine 100 and the cart 200 connected thereto travel over uneven surfaces.

Figure 22A:
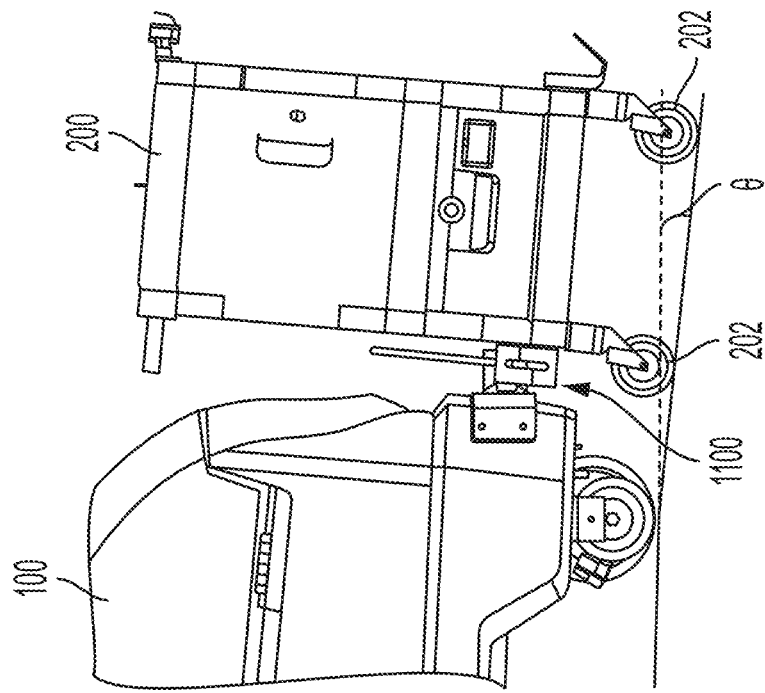
FIG. 22A is a perspective view of a surface maintenance machine with a removable cart attached thereto shown in FIG. 14 traveling along an inclined surface.
Figure 22B:
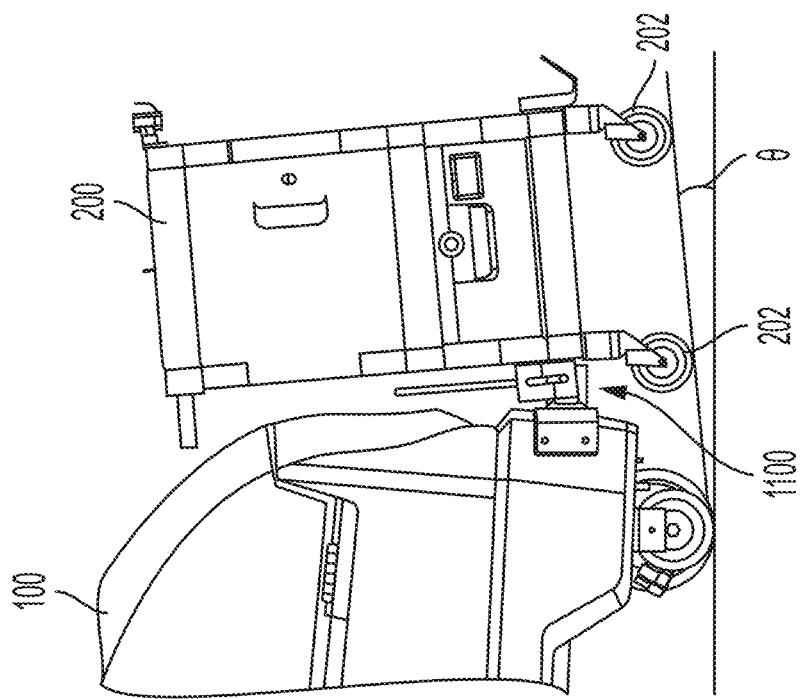
FIG. 22B is a perspective view of a surface maintenance machine with a removable cart attached thereto shown in FIG. 14 traveling along a declined surface.
Figure 23:
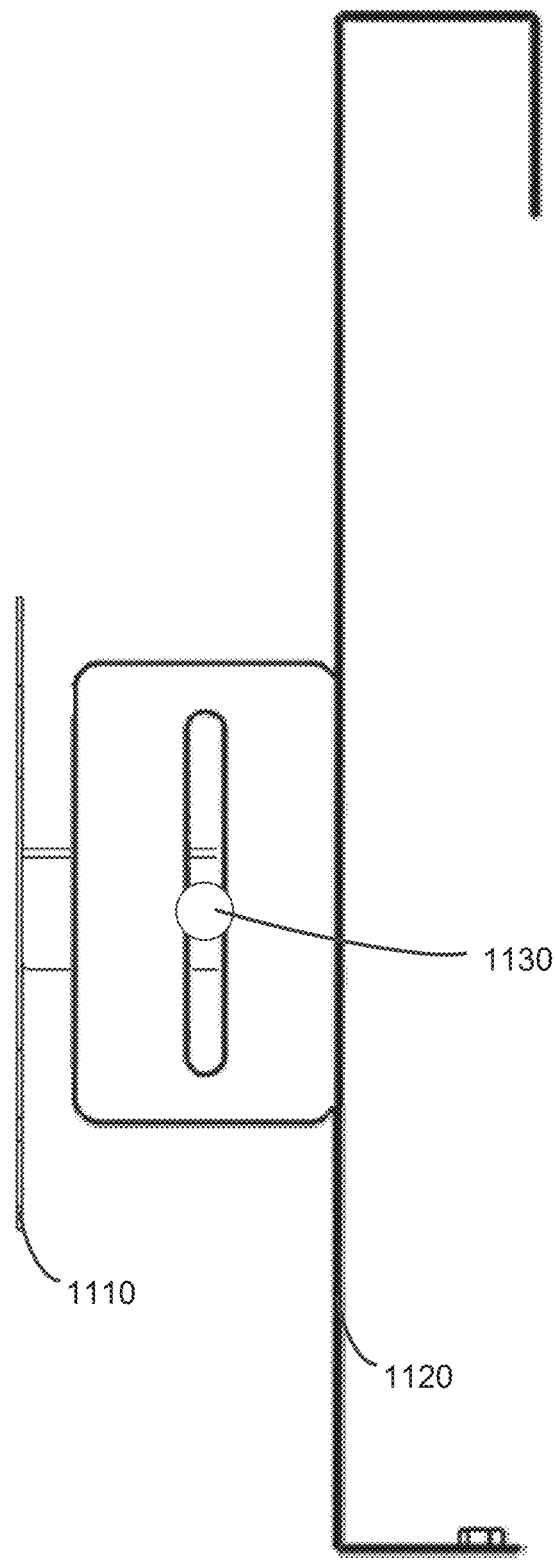
FIG. 23 is a bracket assembly according to another embodiment of the coupling mechanism.

FIGS. 22A and 22B show the floating connection between the storage cart 200 and the surface maintenance machine 100 in use on an uneven surface or a ramp. Appreciably, the position of the storage cart 200 in FIGS. 22A and 22B remains generally parallel to a ramped surface while traveling on a ramp. In FIG. 22A, the storage cart 200 is entering an incline ramp of angle, θ, while the surface maintenance machine 100 has not yet entered the ramp whereas in FIG. 22B, the storage cart 200 is exiting a decline ramp of angle, θ, while the surface maintenance machine 100 has not yet entered the ramp. In either of these instances, the floating connection between the storage cart 200 and the surface maintenance machine 100 provided by the coupling mechanism 1100 allows the wheels 202 of the storage cart 200 to substantially contact the operating surface while the cart 200 remains connected to the surface maintenance machine 100. It should be noted that the coupling mechanism 1100 may be designed to accommodate certain incline and decline angles without unwanted touching between the surface maintenance machine 100 and the storage cart 200.

Figure 17:
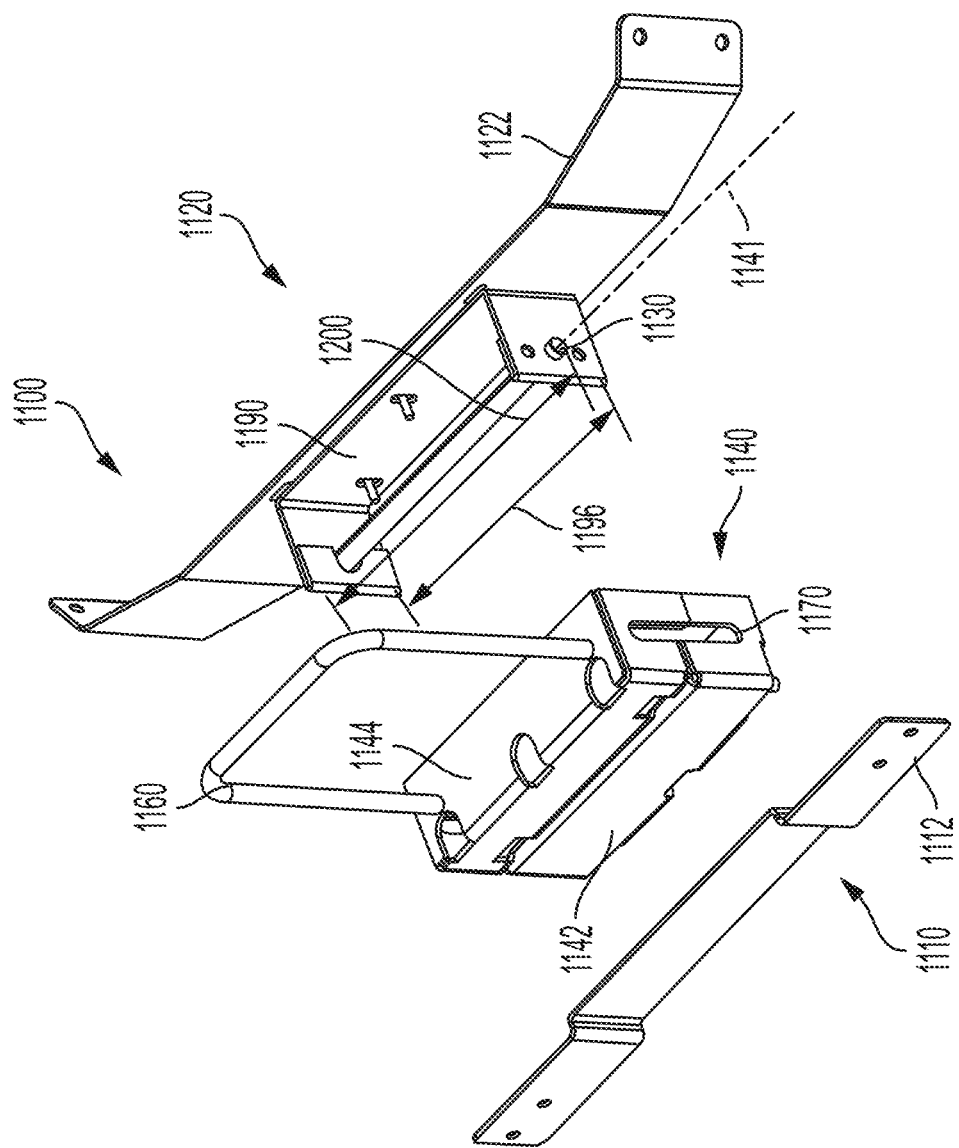
FIG. 17 is an exploded perspective view of the coupling mechanism of FIG. 16.

FIG. 17 is an exploded perspective view of the coupling mechanism 1100 according to certain embodiments. As seen in FIG. 17, the coupling mechanism 1100 includes a cart-side connector 1110 connectable to the storage cart 200 (seen in FIG. 14). Returning to FIG. 17, the cart-side connector 1110 can be non-movable relative to the cart 200 once connected therewith. In the illustrated embodiment, the cart-side connector 1110 is a cart-side bracket 1112 that can be fastened to the cart 200 by way of one or more fasteners (e.g., bolts, rivets, etc.). Alternatively, the cart-side bracket 1112 can be non-removably connected to the cart 200 (e.g., a welded connection, integrally manufactured, etc.). In alternative embodiments, the cart-side "connector" 1110 may not be a bracket or a component separate from the cart 200. In some such embodiments, the cart-side connector 1110 may simply be one or more fasteners (e.g., bolts, rivets, etc.) or a welded connection to a bracket assembly 1140 and/or to a machine-side connector 1120.

With continued reference to FIG. 17, the coupling mechanism 1100 includes a machine-side connector 1120 connectable to the surface maintenance machine 100 (seen in FIG. 14). Returning to FIG. 17, the machine-side connector 1120 can be non-movable relative to the machine 100 once connected therewith. In the illustrated embodiment, the machine-side connector 1120 is a machine-side bracket 1122 that can be fastened to the machine 100 by way of one or more fasteners (e.g., bolts, rivets, etc.). Alternatively, the machine-side bracket 1122 can be non-removably connected to the machine 100 (e.g., a welded connection, integrally manufactured, etc.). In alternative embodiments, the machine-side "connector" 1120 may not be a bracket or a component separate from the machine 100. In some such embodiments, the machine-side connector 1120 may simply be one or more fasteners (e.g., bolts, rivets, etc.) or a welded connection to a bracket assembly 1140 and/or to the cart-side connector 1110.

As seen from FIG. 17, the coupling mechanism 1100 includes a connecting rod 1130. The connecting rod 1130 facilitates engagement between the cart-side connector 1110, the bracket assembly 1140 and the machine-side connector 1120. While the connecting rod 1130 is positioned more proximal to the machine-side connector 1120 than to the cart-side connector 1110 in the illustrated embodiment, in other embodiments, the connecting rod 1130 can be arranged such that the connecting rod 1130 is more proximal to the cart-side connector 1110 rather than to the machine-side connector 1120.

With continued reference to FIG. 17, the coupling mechanism 1100 includes a bracket assembly 1140 positioned between the cart-side connector 1110 and the machine-side connector 1120. The bracket assembly 1140 can be connected to the cart-side connector 1110, and can receive the connecting rod 1130 to engage therewith as described further below.

In advantageous aspects, the coupling mechanism 1100 can provide a floating connection between the cart 200 and the machine 100. For instance, the engagement between the connecting rod 1130 and the bracket assembly 1140 can facilitate limited motion of components of the coupling mechanism 1100 relative to each other, such that the wheels of the cart 200 may remain generally in contact with the operating surface and/or reduce the chances of the cart 200 tipping over relative to the machine 100 when traveling on uneven surfaces (e.g., bumps on the operating, ramps, etc.). In an embodiment, engagement between the connecting rod 1130 and the bracket assembly 1140 can facilitate a relative movement between at least a portion of the bracket assembly 1140 and the connecting rod 1130 in a direction perpendicular to an operating surface on which the surface maintenance machine 100 is traveling. Further, in additional advantageous aspects, the engagement between the connecting rod 1130 and the bracket assembly 1140 can facilitate a pivoting of the bracket assembly 1140 about a pivot axis 1141 passing through the connecting rod 1130.

Figure 18:
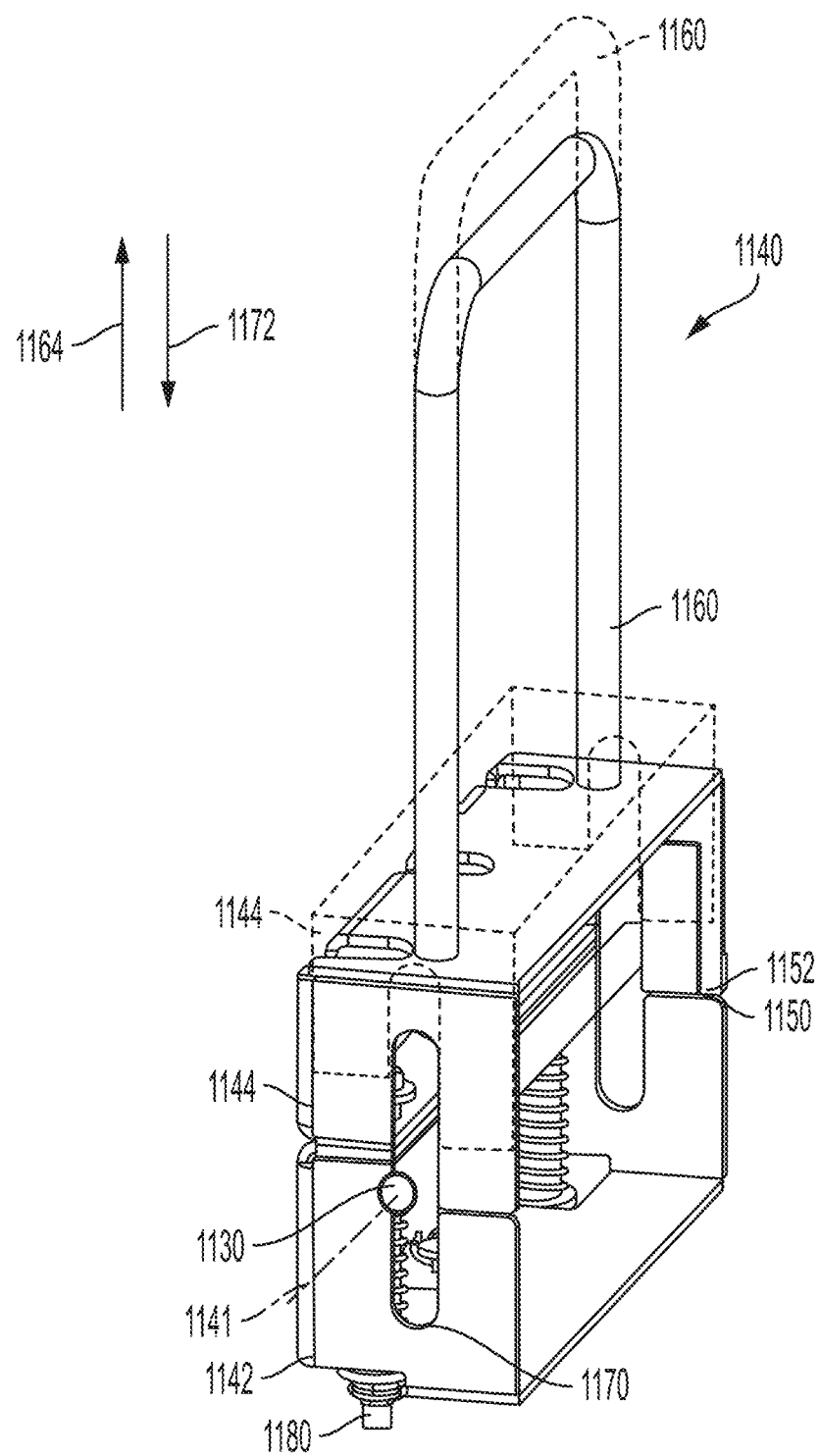
FIG. 18 is a side perspective view of portions of the coupling mechanism of FIG. 16.

FIG. 18 illustrates a perspective view of the bracket assembly 1140 according to an embodiment. The bracket assembly 1140 includes a first bracket 1142 and a second bracket 1144. The first bracket 1142 is connectable to the cart-side connector 1110 in the illustrated embodiment. In some such embodiments, the first bracket 1142 is non-movably connected to the cart-side connector 1110. As described previously, in certain aspects, the cart-side connector 1110 is a cart-side bracket 1112 attached to the cart 200. Accordingly, in some such embodiments, first bracket 1142 can be welded to the cart-side bracket 1112. Alternatively, the cart-side connector 1110 may simply be a fastener, or may include a directly welded connection to the first bracket 1142. In the illustrated embodiment, the first bracket 1142 may not have relative movement with respect to the cart-side connector 1110. Accordingly, when the cart 200 travels over an uneven surface (e.g., bumps, ramps, etc.) the first bracket 1142 may act as a rigid linkage and transfer any forces or torques resulting from travel of the cart 200 on the uneven surface to other parts of the coupling mechanism 1100, as will be described further below.

Figure 19:
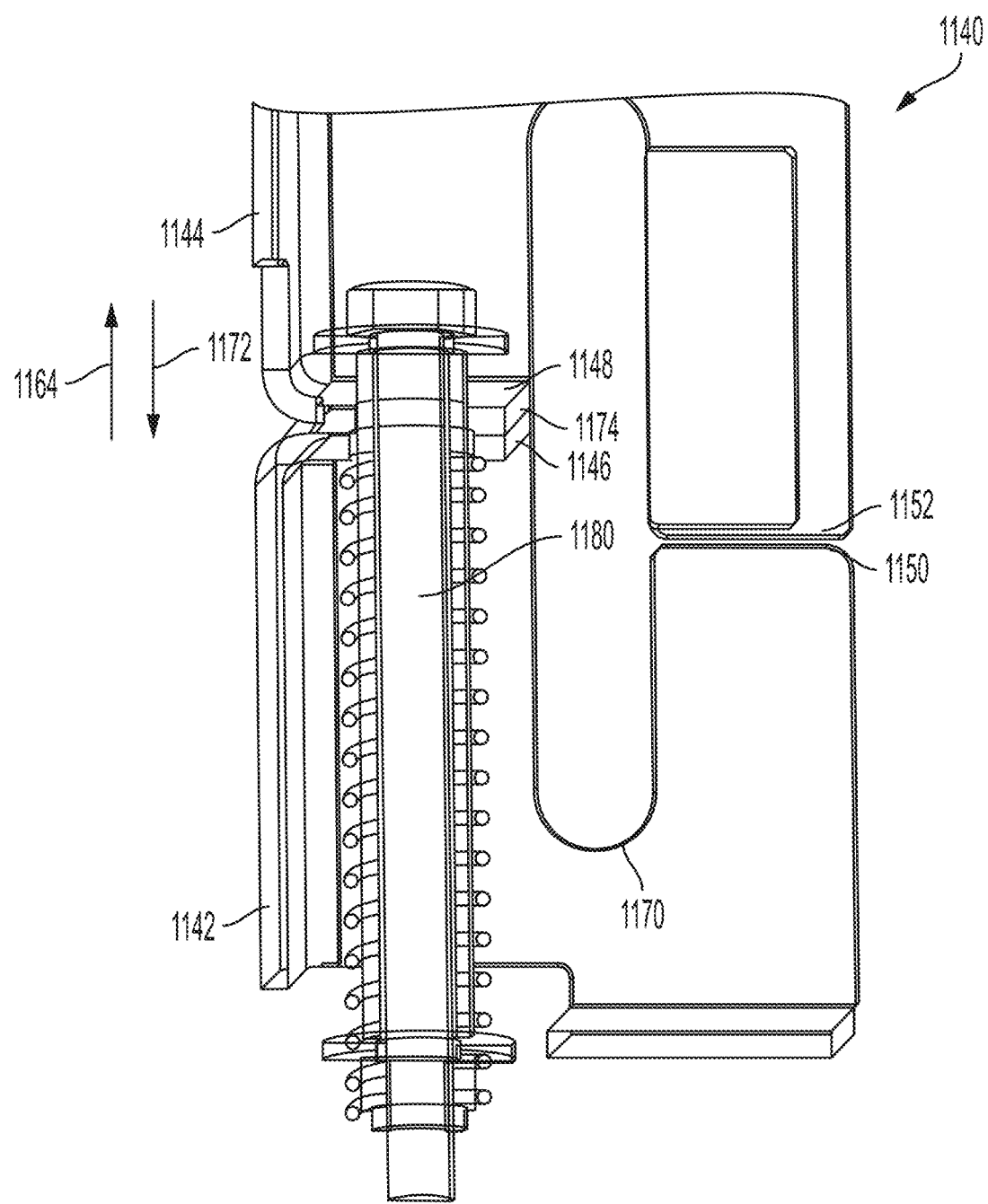
FIG. 19 is a sectional perspective view of portions of the coupling mechanism of FIG. 16.
Figure 20:
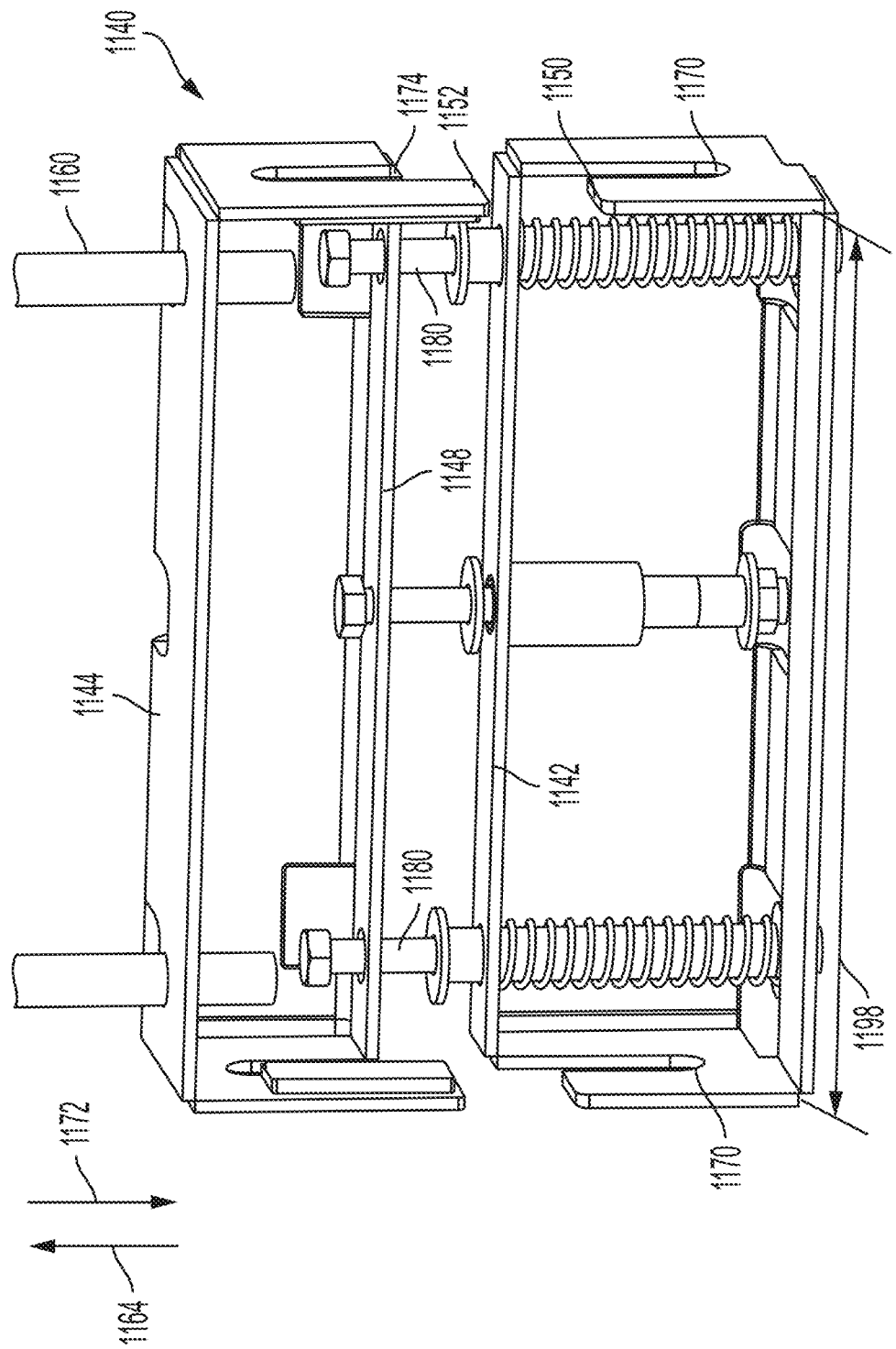
FIG. 20 is a sectional front view of portions of the coupling mechanism of FIG. 16.

As seen in FIG. 18, the bracket assembly 1140 includes a second bracket 1144. The second bracket 1144 can abut at least a portion of the first bracket 1142, and can be movable relative to the first bracket 1142. The first bracket 1142 and the second bracket 1144 can move relative to each other between a closed position and an open position. FIG. 19 illustrates a sectional perspective view of the bracket assembly 1140 in the closed position, while FIG. 20 illustrates a front perspective view of the bracket assembly 1140 in the open position. Appreciably, moving the first bracket 1142 and the second bracket 1144 relative to each other may facilitate connecting and/or disconnecting the storage cart 200 to the machine 100. As seen from FIGS. 18 and 19, each of the first bracket 1142 and the second bracket 1144 can be generally U-shaped and can include a first lip 1146 and a second lip 1148 respectively. Further, each of the first bracket 1142 and the second bracket 1144 can also include respective leading edges 1150, 1152. In the closed position of the bracket assembly 1140, the first lip 1146 and the second lip 1148 can abut each other. Further, in the closed position of the bracket assembly 1140 the leading edges 1150, 1152 of the first bracket 1142 and the second bracket 1144 can abut each other (or be in close proximity to each other). In the open position of the bracket assembly 1140, the first lip 1146 and the second lip 1148 may not abut each other. Further, in the open position of the bracket assembly 1140 the leading edges 1150, 1152 of the first bracket 1142 and the second bracket 1144 may not abut each other (or may be farther apart than in the closed position). In alternative embodiments, the second bracket 1144 may be connected by a non-movable connection to the cart-side connector 1110, and the first bracket 1142 may be movable relative to the cart-side connector 1110 and/or the second bracket 1144.

To connect or disconnect the cart 200 with the surface maintenance machine 100, the bracket assembly 1140 can be manipulated (as will be described further below) to move the bracket assembly 1140 from its closed position to the open position. Referring back to FIG. 18, the coupling mechanism 1100 optionally includes a handle 1160 that can be actuated for connecting or disconnecting the cart 200. In the optional illustrated embodiment, the handle 1160 is provided on the second bracket 1144. Alternatively, the handle 1160 can be provided elsewhere, including the first bracket 1142, or other portions of the coupling mechanism 1100. The handle 1160 can, in some instances, be non-movably connected to the second bracket 1144, such that actuating the handle 1160 (e.g., pulling the handle 1160) in a direction perpendicular to the operating surface (e.g., 120, best seen in FIG. 2) can result in corresponding movement the second bracket 1144 relative to the second bracket 1144 in the direction perpendicular to the operating surface thereby moving the bracket assembly 1140 from the closed position to the open position. For instance, in an embodiment, when the handle 1160 is raised (e.g., along direction 1164) to a position shown in dotted lines in FIG. 18, the second bracket 1144 is also raised (e.g., along direction 1164) to the position shown in dotted lines. The direction 1164 can generally be perpendicular to the operating surface.

With continued reference to FIG. 18, in some embodiments, the first bracket 1142 and the second bracket 1144 can each include an elongate slot 1170. As seen in FIG. 18, the first and second bracket 1142, 1144 can each include cutouts that define the edges of the elongate slot 1170. The elongate slot 1170 can advantageously be oriented such that the elongation is along the direction generally perpendicular to the operating surface. Accordingly, in the illustrated example, when the handle 1160 is raised (e.g., along direction 1164 perpendicular to the operating surface), the second bracket 1144 is lifted (e.g., along direction 1164 perpendicular to the operating surface) to form an opening on the elongate slot 1170. At this instance, the bracket assembly 1140 is in the open position, and the connecting rod 1130 can be brought toward the elongate slot 1170 and received therewithin to connect the machine 100 to the cart 200, or brought away from the elongate slot 1170 to disconnect the machine 100 from the cart 200. Appreciably, the opening on the elongate slot 1170 can be sized so as to be greater than an overall outer dimension (e.g., diameter or thickness) of the connecting rod 1130 to receive the connecting rod 1130 therein.

When the handle 1160 is released, the handle 1160 may lower (e.g., along direction 1172) thereby lowering the second bracket 1144 toward the first bracket 1142 (e.g., 1172). The direction 1172 may be parallel and opposite to the direction 1164. Further, the direction 1172 may be generally perpendicular to the operating surface. The first lip 1146 may abut the second lip 1148 and the leading edges 1150, 1152 of the first and second brackets may abut each other, thereby moving the bracket assembly 1140 from the open position to the closed position.

In alternative embodiments, the handle 1160 can be actuated such that the bracket assembly 1140 can be moved from the closed position to the open position by moving the handle 1160 in a direction 1172 opposite to the direction 1164. For example, rather than pulling on the handle 1160 (along 1164), the operator may push the handle 1160 along direction 1172. In such embodiments, the second bracket 1144 may non-movably be connected to the cart-side connector 1110, and, as such, may act as a rigid linkage to transfer the pushing force exerted by the operator to the first bracket 1142. The first bracket 1142 can, in such embodiments, be movably coupled to the cart-side connector 1110, and may, as such, lower (e.g., along direction 1172), resulting in separation between the leading edges 1150, 1152, thereby moving the bracket assembly 1140 to the open position to facilitate receiving the connecting rod 1130 in the elongate slot 1170.

When the bracket assembly 1140 is in the closed position, the connecting rod 1130 may be permitted to slide in the elongate slot 1170, for instance, when the machine 100 (and/or the cart 200 connected thereto) travel over uneven surfaces. However, the leading edges 1150, 1152 of the first bracket 1142 and the second bracket 1144 may continue to abut each other, thereby acting as an end stop for the connecting rod 1130, and reducing the chances of inadvertent disengagement of the connecting rod 1130 from the elongate slot 1170. Optionally, in some such embodiments, the leading edge 1152 of the second bracket 1144 may be more proximal to the operating surface than a trailing edge 1174 of the second bracket 1144, to facilitate capture of the connecting rod 1130 within the elongate slot 1170.

Referring again to FIGS. 19 and 20, in certain embodiments, the first bracket 1142 and the second bracket 1144 can be connected to each other by one or more spring-loaded pins 1180. Each spring-loaded pin 1180 can be movable between an extended position (when the handle 1160 is actuated by the operator), and a retracted position (when the handle 1160 is released by the operator). In some such embodiments, the spring-loaded pin 1180 can be spring-biased to return to the retracted position from the extended position. Movement of each spring-loaded pin 1180 from the extended position to the retracted position can be associated with movement of the second bracket 1144 toward the first bracket 1142. Accordingly, when the bracket assembly 1140 is in the open position, the spring-loaded pin 1180 is in an extended position, and when the bracket assembly 1140 is in the closed position, the spring-loaded pin 1180 is in the retracted position.

Figure 21:
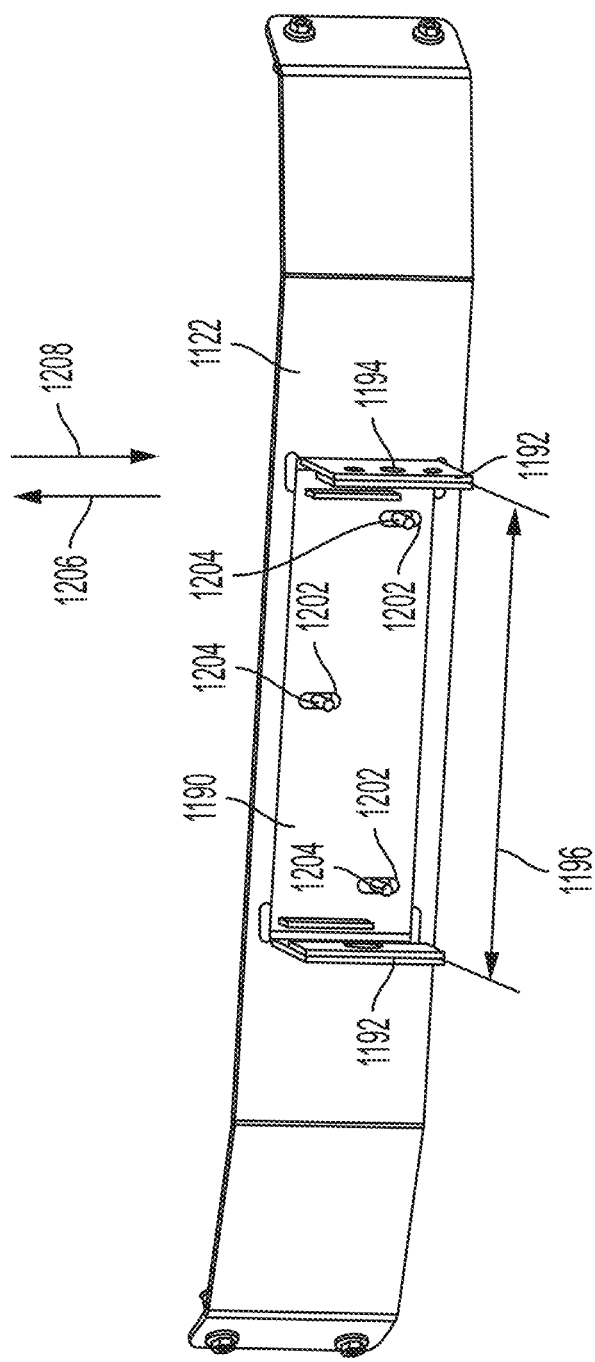
FIG. 21 is a perspective view of the alignment bracket of the coupling mechanism of FIG. 16.

FIG. 21 illustrates a front view of the machine-side connector 1120 according to some embodiments. The machine-side connector 1120, as described previously, can include a machine-side bracket 1122 or simply refer to elements (e.g., fasteners or weld) that permit connection to the machine 100. As seen in FIG. 21, the coupling mechanism 1100 includes an aligning bracket 1190 connectable (e.g., directly, so as to contact) to the machine-side connector 1120. While FIG. 21 shows the aligning bracket 1190 connected to the machine-side connector 1120, appreciably, the positioning of the aligning bracket 1190 can be elsewhere that would permit suitable alignment. For example, in one embodiment, the aligning bracket 1190 (and/or the connecting rod 1130) can be connected (e.g., directly, so as to contact) to the cart-side connector 1110. In such embodiments, the first bracket 1142 of the bracket assembly 1140 may be connected to the machine-side connector 1120. Other positions of the aligning bracket 1190 and the bracket assembly 1140 are also contemplated.

The aligning bracket 1190 can permit alignment thereof with the bracket assembly 1140, so as to bring the connecting rod 1130 in proximity to the elongate slot 1170 of the first and the second bracket 1144. Referring back to FIG. 17 and with continued reference to FIG. 21, the aligning bracket 1190 includes a pair of lateral flanges 1192. The lateral flanges 1192 protrude outwardly from the machine-side bracket 1122 illustrated in FIG. 17. The lateral flanges 1192 can have openings 1194 thereon for receiving the connecting rod 1130. The lateral flanges 1192, in advantageous embodiments, can be separated by a distance 1196 greater than a width 1198 (best seen in FIG. 20) of the bracket assembly 1140. In further advantageous embodiments, a length 1200 of the connecting rod 1130 can be equal to or slightly greater than the distance 1196 between the lateral flanges 1192. Accordingly, when the bracket assembly 1140 is engaged with the connecting rod 1130, the lateral flanges 1192 can be positioned adjacent to the elongate slot 1170. For instance, as seen in FIG. 16, the lateral flanges 1192 can be positioned to the exterior of and/or surround the lateral surfaces of the first bracket 1142 and/or the second bracket 1144 on which the elongate slot 1170 is defined.

During use, an operator can use the lateral flanges 1192 as guide surfaces to self-center the bracket assembly 1140 prior to actuating the handle 1160 to move the bracket assembly 1140 to the open position to receive the connecting rod 1130. The aligning bracket 1190 can, in such advantageous embodiments, provide lateral and/or transverse (e.g., in a direction perpendicular to the operating surface) alignment with respect to the bracket assembly 1140, and thereby offer ease of connection of the cart 200 to the machine 100.

Referencing FIG. 21, in certain aspects, the aligning bracket 1190 includes one or more elongate slots 1202. Each elongate slot 1202 of the aligning bracket 1190 can be oriented so as to be elongate along the direction perpendicular to the operating surface. Each elongate slot 1202 of the aligning bracket 1190 can receive a fastener 1204 to connect the aligning bracket 1190 to the machine-side connector 1120. In embodiments where the aligning bracket 1190 is directly engageable with the cart-side connector 1110, the elongate slots 1202 of the aligning bracket 1190 can engage with fasteners 1204 that can connect the aligning bracket 1190 directly (e.g., in contact with) to the cart-side connector 1110.

Referencing FIGS. 16, 17 and 21, in some advantageous aspects, the aligning bracket 1190 can cooperate with the bracket assembly 1140 so as to provide a floating connection between the cart-side connector 1110 and the machine-side connector 1120 such that relative movement of the cart 200 and the machine 100 is limited, for instance, when the cart 200 and/or the machine 100 travel on uneven surfaces (e.g., bumps on the floor, climbing a ramp, etc.). In an embodiment, when the connecting rod 1130 is permitted to slide in the elongate slot 1170, (e.g., in a direction perpendicular to the operating surface, illustrated by arrows 1206, 1208) the lateral flanges 1192, by virtue of their non-movable coupling to the connecting rod 1130, cooperate with the connecting rod 1130. As a result, the aligning bracket 1190 moves relative to the machine-side connector 1120 (and/or the cart-side connector 1110) in the direction 1206, 1208, which is associated with relative sliding between the elongate slots 1202 and the fasteners 1204. The relative sliding of the connecting rod 1130 with respect to the elongate slot 1170 and/or the aligning bracket 1190 with respect to the machine-side connector 1120 can provide a floating connection and can facilitate maintaining the wheels of the cart 200 on the operating surface when the cart 200 is traveling over an uneven surface (e.g., bumps or ramps).

In additional embodiments, the engagement between the connecting rod 1130 and the bracket assembly 1140 can facilitate a pivoting of the bracket assembly 1140 about a pivot axis 1141 passing through the connecting rod 1130. For example, the first bracket 1142 and/or the second bracket 1144 may pivot relative to the connecting rod 1130 when the wheels of the cart 200 travel over an uneven surface. The pivoting may result in maintaining the wheels of the cart 200 on the operating surface when the cart 200 is traveling over an uneven surface (e.g., bumps or ramps).

As mentioned above, the positioning of the connecting rod 1130 and/or the aligning bracket 1190, and the first bracket 1142 of the bracket assembly 1140 can be modified such that the connecting rod 1130 and/or the aligning bracket 1190 are directly coupled to the cart-side connector 1110. Alternatively, the connecting rod 1130 and/or the aligning bracket 1190 may be indirectly coupled to the cart-side connector 1110 but may be more proximal to the cart-side connector 1110 than to the machine-side connector 1120. Similarly, the first bracket 1142 of the bracket assembly 1140 can be modified such that the first bracket 1142 is directly coupled to the machine-side connector 1120. For instance, the first bracket 1142 can be more proximal to the machine-side connector 1120 than to the cart-side connector 1110.

During use, an operator can connect a cart 200 such as those disclosed in FIGS. 14-22 to the machine 100 by bringing the cart 200 in proximity to the machine 100, and optionally bringing the lateral flanges 1192 of the aligning bracket 1190 in proximity to the bracket assembly 1140 to self-center (e.g., in a transverse and/or lateral direction) the connecting rod 1130 with respect to the bracket assembly 1140. The operator can then actuate the handle 1160 (e.g., by raising along direction 1164 or lowering along direction 1172) to move the bracket assembly 1140 from the closed position to the open position. The connecting rod 1130 can then be received in the elongate slot 1170. At this point, when the operator releases the handle 1160, the spring-biasing of the spring-loaded locking pins 1180 may move the bracket assembly 1140 from the open position to the closed position, thus connecting the cart 200 to the machine 100.

To disassemble the cart 200, the operator can actuate the handle 1160 (e.g., by raising along direction 1164 or lowering along direction 1172) to move the bracket assembly 1140 from the closed position to the open position. The cart 200 can then be separated from the machine 100 by disengaging the connecting rod 1130 from the elongate slot 1170. At this point, when the operator releases the handle 1160, the spring-biasing of the spring-loaded locking pins 1180 may move the bracket assembly 1140 from the open position to the closed position, thus disconnecting the cart 200 to the machine 100.

Another embodiment of the coupling mechanism 1100 is shown in FIGS. 23-26. This coupling mechanism can be similar to those described elsewhere herein except that the bracket assembly 1140 may include a mount 2310 and a receiver 2410. Therefore, a description of like components, features, connections, etc. between embodiments may be omitted for brevity. Though described below in connection with either the cart-side connector 1110 or machine-side connector 1120 only, one skilled in the art will appreciate that the mount 2310 and receiver 2410 can be connected either to the cart-side connector 1110 or machine-side connector 1120. One skilled in the art will also appreciate that components, features, connections, etc. of certain embodiments may be incorporated into other embodiments without exceeding the scope of this disclosure.

Figure 24A:
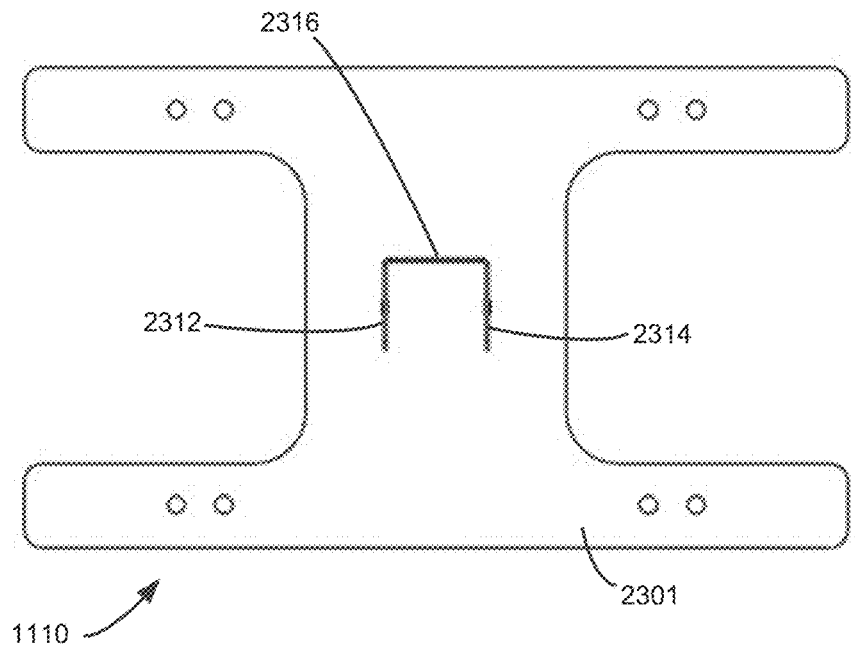
FIG. 24A is a front elevational view of a mount shown in FIG. 23.
Figure 24B:
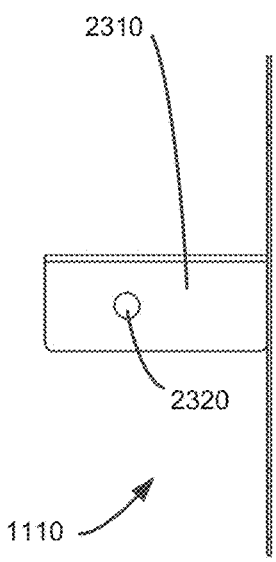
FIG. 24B is a side elevational view of the mount shown in FIG. 23.

As shown in FIGS. 24A and 24B, the mount 2310 may include one or more flanges extending outward from a cart-side connector base 2301. In many embodiments, the mount 2310 may have a first lateral mount flange 2312 and a second lateral mount flange 2314 that opposes the first lateral mount flange 2312. The mount 2310 can include circular apertures 2320 extending through both the first and second lateral mount flanges 2312, 2314. Some embodiments of the mount 2310 may include one or more intermediate mount flanges 2316 extending from the first lateral mount flange 2312 to the second lateral mount flange 2314. An illustrative embodiment can have the intermediate mount flange 2316 at the uppermost end of the first and second lateral mount flanges 2312, 2314. In alternative embodiments, the mount 2310 may be a separate component connectible to the cart-side connector 1110.

Figures 25A, 25B:
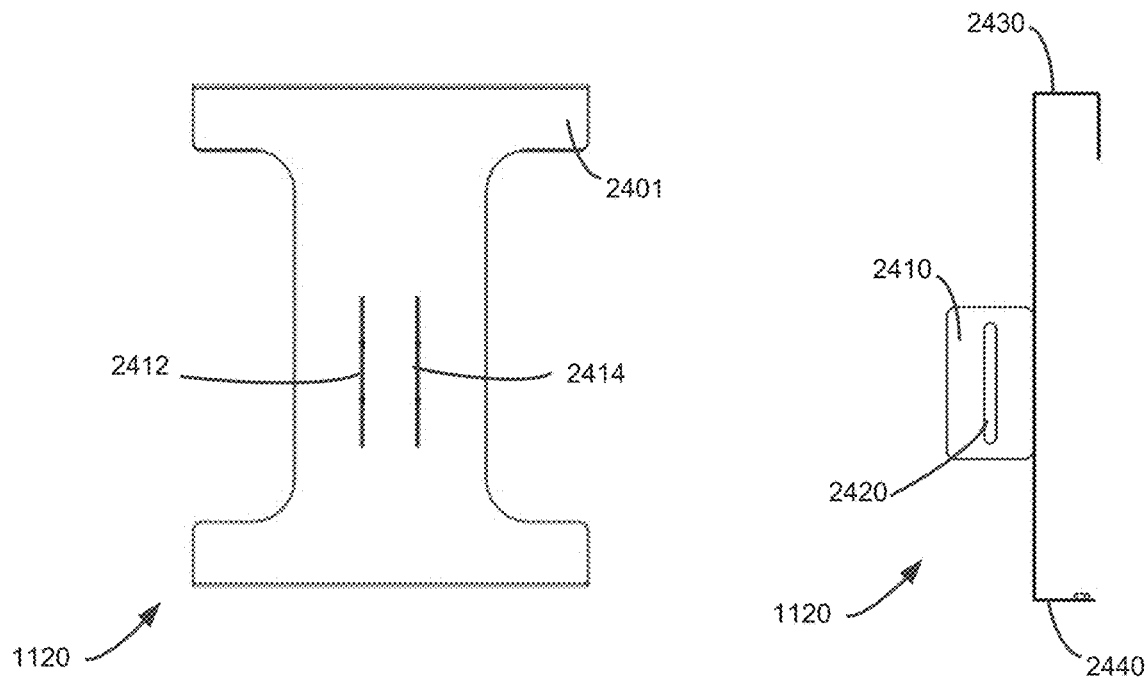
FIG. 25A is a front elevational view of a receiver shown in FIG. 23.
FIG. 25B is a side elevational view of the receiver shown in FIG. 23.

As shown in FIGS. 25A and 25B, the receiver 2410 may include one or more flanges extending outward from a machine-side connector base 2401. In some such embodiments, an upper portion of the machine-side connector 1120 can include a machine-side connector lip 2430 that may be supported by a portion of the machine 100. Further in some such embodiments, a lower portion of the machine-side connector 1120 can include a machine-side connector flange 2440 that can engage (e.g., fasten, weld, hook, and the like) to a portion of the surface maintenance machine 100. The receiver 2410 may have a first lateral receiver flange 2412 and a second lateral receiver flange 2414 and elongate apertures 2420 extending through both the first and second lateral receiver flanges 2412, 2414. In some embodiments, the elongate apertures 2420 can be elongated in a direction perpendicular to the operating surface. In alternative embodiments, the receiver 2410 may be a separate component connectible to the machine-side connector 1120. The receiver 2410 may be configured to receive the mount 2310 such that, for example, the mount 2310 fits within the receiver 2410 or the receiver 2410 fits within the mount 2310.

Figure 26B:
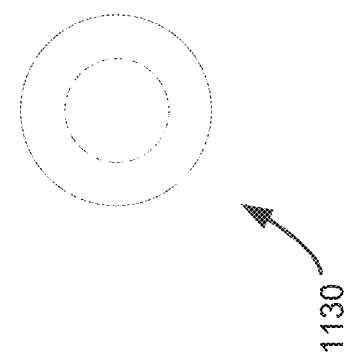
FIG. 26B is a side elevational view of the connecting rod shown in FIG. 23.
Figure 26A:
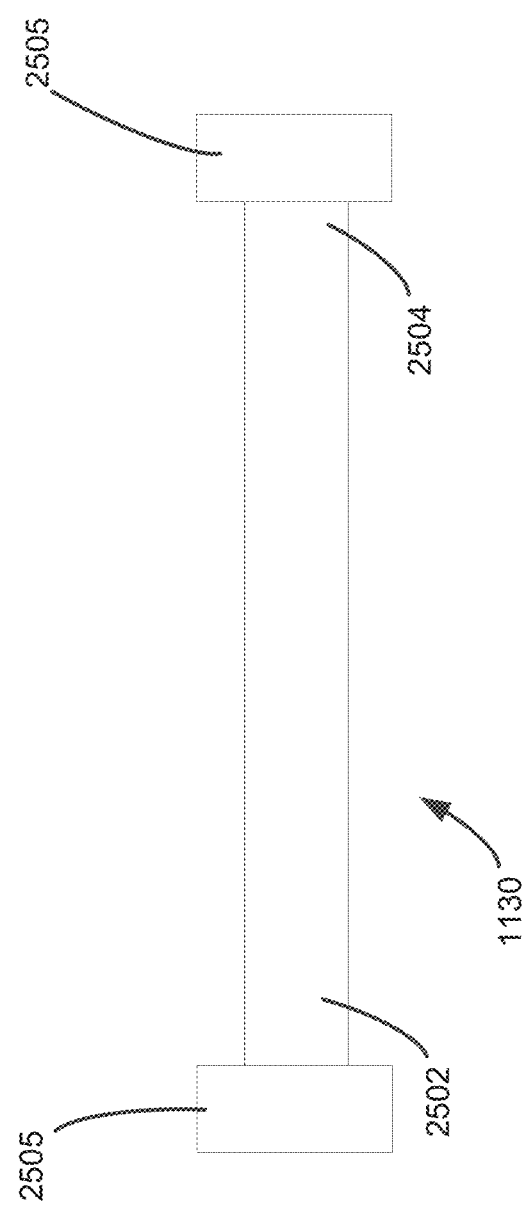
FIG. 26A is a front elevational view of a connecting rod shown in FIG. 23.

As shown in FIGS. 26A and 26B, the connecting rod 1130 can be similar to those described elsewhere herein. In some embodiments, the connecting rod 1130 can include a first connecting rod end 2502 and a second connecting rod end 2504. Either or both of the first and second connecting rod ends 2502, 2504 may include a locking mechanism 2505 (e.g., fastener, nut, extrusion, lock, etc.). The locking mechanism 2505 may prevent the connecting pin from detrimental movement within the bracket assembly 1140 in the direction of the pivot axis 1141 passing through the connecting rod 1130 while allowing the connecting rod 1130 to pivot and rotate within the circle apertures and elongate apertures 2420. The locking mechanism 2505 in many embodiments may facilitate installation, removal, or operation of the coupling mechanism 1100.

Referring again to FIG. 23, once assembled, the coupling mechanism can function similar to those described elsewhere herein. In use, for example, the circular apertures 2320 in the first and second lateral mount flanges 2312, 2314 can be aligned with the elongate apertures 2420 in the first and second lateral receiver flanges 2412, 2414. Then, the connected rod 1130 may be received by the circular apertures 2320 and the elongate apertures 2420 and the locking mechanism 2505 can secure the connecting rod 1130 in the circular apertures 2320 and the elongate apertures 2420. In many embodiments, the connecting rod 1130 may move within the elongate aperture in the direction perpendicular to the operating surface and may have limited movement within the circular aperture in the direction perpendicular to the operating surface. Either or both of the mount 2310 and the receiver 2410 can be designed such that the connecting rod 1130 can travel the length of the elongate aperture 2420.

In some embodiments, the elongate aperture 2420 and the circular aperture may be on the other of the mount 2310 or the receiver 2410. In alternate embodiments, the circular aperture 2320 may have a different profile (e.g., square, triangular, etc.) so long as the aperture limits movement of the rod within the aperture in the direction perpendicular to the operating surface.

Embodiments of the surface maintenance machine 100 with a cart 200 such as those illustrated herein permit an operator to store tools and supplies for performing manual surface maintenance operations in situations where the machine 100 may not be able to travel (e.g., areas with aisle widths narrower than the width of the machine 100) or for selective off-the-floor manual maintenance. Additionally, the cart 200 provides and/or increases storage space to allow an operator to replenish materials and/or cleaning supplies.

Various examples have been described. These and other examples are within the scope of this disclosure.

What is claimed is:

1. A coupling mechanism for removably coupling a storage cart to a surface maintenance machine, the storage cart comprising a mobile body supported by a plurality of wheels, the coupling mechanism comprising:
   a cart-side connector connectable to the storage cart;
   a machine-side connector connectable to the surface maintenance machine;
   a connecting rod facilitating an engagement between the cart-side connector and the machine-side connector; and
   a bracket assembly positioned between the cart-side connector and the machine-side connector, the bracket assembly being connectable with the cart-side connector and/or the machine-side connector, wherein the bracket assembly comprises a first bracket and a second bracket, the first bracket and the second bracket each having an elongate slot, the elongate slot being configured to receive the connecting rod thereby engaging the cart-side connector with the machine-side connector to engage the storage cart to the surface maintenance machine,
   the engagement between the connecting rod and the bracket assembly facilitating:
      a first relative movement between the connecting rod and at least a portion of the bracket assembly in a direction perpendicular to an operating surface on which the surface maintenance machine is traveling, and
      a pivoting of the bracket assembly about a pivot axis passing through the connecting rod,
      the first relative movement and the pivoting maintaining each wheel of the plurality of wheels of the storage cart on the operating surface during travel of the surface maintenance machine thereon.

2. The coupling mechanism of claim 1, wherein the elongate slot is oriented so as to be elongate along the direction perpendicular to the operating surface.

3. The coupling mechanism of claim 1, wherein the first bracket is connectable to the cart-side connector.

4. The coupling mechanism of claim 1, further comprising a handle attachable to the second bracket, the handle being configured to be raised or lowered to engage or disengage the connecting rod from the elongate slot, to connect or disconnect, respectively, the storage cart from the surface maintenance machine.

5. The coupling mechanism of claim 4, wherein the handle is configured to be raised or lowered in the direction perpendicular to the operating surface, wherein, raising or lowering the handle permits a second relative movement between the first bracket and the second bracket in the direction perpendicular to the operating surface.

6. The coupling mechanism of claim 5, wherein the first bracket and the second bracket are connected to each other by one or more spring-loaded pins, each spring-loaded pin being movable to an extended position when the handle is raised, each spring-loaded pin being movable to a retracted position when the handle is lowered, wherein each spring-loaded pin is spring-biased to return to the retracted position from the extended position.

7. The coupling mechanism of claim 6, wherein movement of each spring-loaded pin from the extended position to the retracted position is associated with movement of the second bracket toward the first bracket.

8. The coupling mechanism of claim 1 wherein the second bracket comprises a leading edge and a trailing edge opposite to the leading edge, the leading edge being more proximal to the connecting rod than the trailing edge when the connecting rod is being brought toward the elongate slot to be received therewithin, the leading edge being more proximal to the operating surface than the trailing edge, the leading edge acting as an end stop for the connecting rod received in the elongate slot to prevent inadvertent removal thereof.

9. The coupling mechanism of claim 1, further comprising an aligning bracket connectable to the machine-side connector, the aligning bracket being configured to align with the bracket assembly so as to permit engagement of the connecting rod with the bracket assembly.

10. The coupling mechanism of claim 9, wherein the aligning bracket comprises one or more elongate slots, each elongate slot of the aligning bracket being oriented so as to be elongate along the direction perpendicular to the operating surface.

11. The coupling mechanism of claim 10, wherein each elongate slot of the aligning bracket is engageable with corresponding fasteners to connect the aligning bracket to the machine-side connector, each elongate slot of the aligning bracket permitting a third relative movement between the aligning bracket and the machine-side connector in the direction perpendicular to the operating surface.

12. The coupling mechanism of claim 9, wherein the aligning bracket comprises lateral flanges with openings for receiving the connecting rod, the lateral flanges being separated by a distance greater than a width of the bracket assembly such that when the connecting rod is received in the elongate slot of the first and second brackets, the lateral flanges are adjacent to and positioned to the exterior of the first and second brackets.

13. The coupling mechanism of claim 1, wherein the bracket assembly comprises a mount and a receiver, the mount having a first lateral mount flange, a second lateral mount flange opposite the first lateral mount flange, and a mount aperture extending through the first and second lateral mount flanges, the receiver being configured to receive the mount and having a first lateral receiver flange, a second lateral receiver flange opposite first lateral receiver flange, and a receiver aperture extending through the first and second lateral receiver flanges, the mount aperture and the receiver aperture being configured to receive the connecting rod thereby engaging the cart-side connector with the machine-side connector to engage the storage cart to the surface maintenance machine.

14. The coupling mechanism of claim 13, wherein either the mount aperture or the receiver aperture is elongate along the direction perpendicular to the operating surface.

15. The coupling mechanism of claim 14, wherein the other of the mount aperture or the receiver aperture that is not elongate is circular.

16. The coupling mechanism of claim 15, wherein the receiver aperture is elongate along the direction perpendicular to the operating surface and the mount aperture is circular.

17. The coupling mechanism of claim 13, wherein the connecting rod further comprises a first and second end and wherein either the first or second end comprises a locking mechanism configured to secure the connecting rod in the direction of the pivot axis passing through the connecting rod.

18. The coupling mechanism of claim 17, wherein the locking mechanism is a fastener.

19. The coupling mechanism of claim 13, wherein the first lateral mount flange and the second lateral mount flange are separated by a distance greater than a width of the mount such that when the connecting rod is received in the receiver aperture, the first lateral mount flange and the second lateral mount flange are adjacent to and positioned to the exterior of the first and second lateral receiver flanges.

20. A surface maintenance machine, comprising:
a mobile body supported by a plurality of wheels;
one or more surface maintenance tools configured to perform one or more surface maintenance operations on an operating surface; and
a coupling mechanism for removably coupling a storage cart to the surface maintenance machine, the coupling mechanism comprising:
a cart-side connector connectable to the storage cart,
a machine-side connector connectable to the surface maintenance machine,
a connecting rod facilitating an engagement between the cart-side connector and the machine-side connector, and
a bracket assembly positioned between the cart-side connector and the machine-side connector, the bracket assembly being connectable with the cart-side connector, the bracket assembly being configured to receive the connecting rod,
the engagement between the connecting rod and the bracket assembly facilitating:
a first relative movement between the storage cart and the surface maintenance machine in a direction perpendicular to an operating surface on which the surface maintenance machine is traveling, and
a pivoting of the bracket assembly about a pivot axis passing through the connecting rod,
the first relative movement and the pivoting maintaining each wheel of a plurality of wheels of the storage cart on the operating surface during travel of the surface maintenance machine thereon.

21. The surface maintenance machine of claim 20, wherein the mobile body comprising a front surface, a rear surface opposite to the front surface and lateral surfaces positioned laterally to the front surface and/or rear surface, wherein the coupling mechanism is coupled to at least one of the front surface, rear surface or lateral surface.

22. The surface maintenance machine of claim 21, wherein the coupling mechanism is coupled to the front surface of the surface maintenance machine such that an uppermost surface of the storage cart is more proximal to the operating surface than an uppermost surface of the surface maintenance machine.

23. The surface maintenance machine of claim 22, further comprising an on-board power source housed in the mobile body, the on-board power source configured to provide power to and thereby self-propel the surface maintenance machine by imparting a rotational movement to at least one wheel of the plurality of wheels of the surface maintenance machine, thereby propelling the surface maintenance machine.

24. The surface maintenance machine of claim 20, wherein the surface maintenance machine has machine width defined between opposite lateral surfaces thereof, the machine width being greater than or equal to a cart width of the storage cart.

25. A surface maintenance machine, comprising:
- a mobile body supported by a plurality of wheels, the mobile body comprising a front surface, a rear surface opposite to the front surface and lateral surfaces positioned laterally to the front surface and/or rear surface;
- an on-board power source housed in the mobile body, the on-board power source configured to provide power to and thereby self-propel the surface maintenance machine by imparting a rotational movement to at least one wheel of the plurality of wheels of the surface maintenance machine, thereby propelling the surface maintenance machine;
- one or more surface maintenance tools configured to perform one or more surface maintenance operations on an operating surface;
- a cart removably connectable with at least one of the front surface, rear surface or lateral surfaces of the surface maintenance machine, the cart comprising a hollow body portion for storing one or more surface maintenance tools and/or supplies;
- a cart-side connector connectable to the cart;
- a machine-side connector connectable to the mobile body;
- a connecting rod facilitating an engagement between the cart-side connector and the machine-side connector; and
- a bracket assembly positioned between the cart-side connector and the machine-side connector, the bracket assembly being connectable with the cart-side connector and/or the machine-side connector, wherein the bracket assembly comprises a mount and a receiver, the mount having a first lateral mount flange, a second lateral mount flange opposite the first lateral mount flange, and a mount aperture extending through the first and second lateral mount flanges, the receiver being configured to receive the mount and having a first lateral receiver flange, a second lateral receiver flange opposite first lateral receiver flange, and a receiver aperture extending through the first and second lateral receiver flanges, the mount aperture and the receiver aperture being configured to receive the connecting rod thereby engaging the cart-side connector with the machine-side connector to engage the cart to the mobile body.

26. The surface maintenance machine of claim 25, wherein an engagement between the cart and the mobile body of the surface maintenance machine prevents movement of the cart relative to the surface maintenance machine when the cart is connected to the surface maintenance machine.

* * * * *